United States Patent [19]

Yamagishi et al.

[11] Patent Number: 4,779,261

[45] Date of Patent: Oct. 18, 1988

[54] LOOP NETWORK

[75] Inventors: Osamu Yamagishi; Tomoo Kunikyo, both of Tokyo; Tatsuo Kaji, Kawasaki, all of Japan

[73] Assignee: Kabushiki Kaisha Toshiba, Kanagawa, Japan

[21] Appl. No.: 909,014

[22] Filed: Sep. 17, 1986

[30] Foreign Application Priority Data

Sep. 24, 1985 [JP] Japan ................................. 60-208831
Sep. 30, 1985 [JP] Japan ................................. 60-217274
Sep. 30, 1985 [JP] Japan ................................. 60-217279
Dec. 24, 1985 [JP] Japan ................................. 60-291303
Dec. 24, 1985 [JP] Japan ................................. 60-291304

[51] Int. Cl.$^4$ .................................................. H04J 3/00
[52] U.S. Cl. ................................. 370/16; 340/825.05; 370/86
[58] Field of Search ................. 370/85, 86, 88, 14, 370/16; 340/825.01, 825.05, 825.06, 825.07

[56] References Cited

U.S. PATENT DOCUMENTS 3,755,789  8/1973  Collins .................................. 370/88
3,879,582  4/1975  White et al. ........................... 370/88
4,680,756  7/1987  Sugimoto et al. ..................... 370/88

Primary Examiner—Douglas W. Olms
Assistant Examiner—Frank M. Scutch, III
Attorney, Agent, or Firm—Finnegan, Henderson, Farabow, Garrett and Dunner

[57] ABSTRACT

The present invention relates to a loop network arranged by loop-connecting a control station and a number of substations through a main transmission path where at least one of the substations comprises a branch station inserting and coupling another station into the main transmission path as a lobe or subloop. In order to prevent an out-of-step condition of the main transmission path, resulting from a failure in the lobe or subloop, the branch station includes a frame buffer for normally selecting the signal from the lobe or subloop and selecting the signal from the main transmission path during detection of a failure and on a bypass command, and for accumulating the selected signal in units of a single frame, and a mechanism for supplying the accumulated signal to the main transmission path.

6 Claims, 8 Drawing Sheets

FIG. 6
FIG. 7
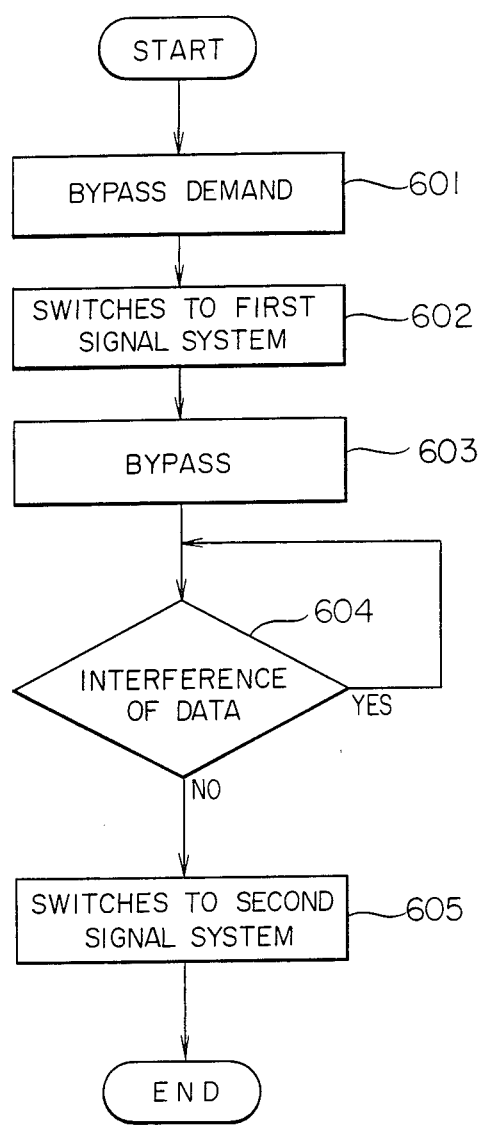
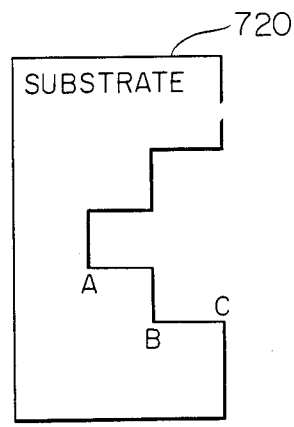

# LOOP NETWORK

The present application claims priority of Japanese Application No. 60-208831 filed on Sept. 18, 1985, No. 60-217274 and No. 60-217279 filed on Sept. 30, 1985 respectively, and No. 60-291303 and No. 60-291304 filed on Dec. 24, 1985 respectively.

FIELD OF THE INVENTION AND RELATED ART STATEMENT

The present invention relates generally to a loop network for preventing an out-of-step condition of a main transmission path caused during the by-pass on a lobe or subloop, or due to failure in a lobe or subloop.

In response to the development of data processing techniques, various types of systems have been developed to allow data transmission between data processing devices in separate locations and each of which is coupled through a station to a data transmission path. These systems are classified into star-type networks, bus-type networks, loop networks and so on, in accordance with the type of transmission path used.

Of these systems, the loop network is advantageous in that it is possible to easily increase the number of stations and effectively perform data transmission using relatively simple controls.

FIG. 8 is a schematic diagram showing an arrangement for a loop network. In the figure, reference numeral 1 designates a control station, numeral 2 represents the stations, numeral 3 depicts a subloop branch station, and numeral 4 is a lobe branch station. The loop network is arranged by connecting these stations through main transmission path 5 in loop-like fashion.

Here, subloop branch station 3 is arranged so that a subloop, comprising stations 3a, 3b --- 3n, which are connected in series, is coupled in series with respect to main transmission path 5. A bypass switch SW is provided to each of the stations 3a, 3b --- 3n so that stations 3a, 3b --- 3n are respectively bypassed in the subloop. Also included in subloop branch station 3 is a bypass switch SW for separating the subloop from transmission path 5.

On the other hand, lobe branch station 4 includes one or more stations 4a, 4b --- 4n which are coupled in series to transmission path 5. Also includes in lobe branch station 4 is one or more bypass switches SW, each of which bypasses one of stations 4a, 4b --- 4n, with respect to main transmission path 5.

These bypass switches SW ensure the functioning of the loop network by separating a specific station of the subloop or lobe or the entire subloop from the main transmission path 5.

Control station 1 is comprised of synchronizing pattern 6a and data slots 6b, for example, as shown in FIG. 9, signal 6 with a frame arrangement, is supplied to main transmission path 5 at a predetermined interval, to control information transmission between the multiple stations 1, 2, 3 and 4, performed through main transmission path 5.

For example, a unique value which will not appear in the area of the data slots is given to the synchronizing pattern 6a of the above-mentioned frame. When each station detects this unique synchronizing pattern 6a, a judgement can be made such that it is the leading end of a frame. In a normal condition, the synchronizing pattern 6a appears for every constant period to establish frame synchronization.

Data slots 6b are provided as a signal system mB1C encoder, and is comprised of, for example, m-bit data and one-bit complementary bit C. The mB1C encoding is such that the complement of the final bit data of m-bit data, i.e., the reverse data of the final bit data, is made as complementary bit C.

Estimating that data of m-bits corresponding to one word, each station monitors the final bit and a complementary bit C giving the complementary relationship there-between. In a normal condition the complemetary relationship is effected, and therefore the word synchronization is established.

As described above, in the conventional loop network with this arrangement, the separation of subloop branch station 3 and lobe branch station 4 for switching to the bypass path is made by means of the bypass switches SW. Furthermore, when failures occur in the lobe or subloop, the bypass switches SW of subloop branch station 3 or lobe branch station 4 are actuated so that the subloop or lobe is separated from the system. A signal fed from main transmission path 5 to subloop branch station 3 or lobe branch station 4 bypasses the lobe or subloop and directly reaches main transmission path 5. In other words, a signal supplied through the lobe or subloop to main transmission path 5 is fed directly.

Accordingly, when the above-mentioned bypass mode a part of the signal disappears, caused by the transient characteristic of the bypass switch, signal disturbance occurs.

At this time, if the mB1C code rule is not satisfied (the complementary relationship between the m-th bit and the complementary bit C is not effective), and the word synchronization is stepped out.

At this time, if the above-mentioned synchronizing pattern disappears, the frame synchronization is stepped out.

Further, due to delays in signal transmission in the above-mentioned lobe or subloop and stations, a frame will not appear on the transmission path for every cycle period during the above-mentioned bypass mode, incurring out-of-step word synchronization and frame synchronization consecutively affect the subsequent stages.

Stations affected by these out-of-step synchronizations should be synchronized. However, there has been the problem of data transmission through a network being interrupted during this resynchronization.

OBJECT AND SUMMARY OF THE INVENTION

The present invention is devised in view of the above-mentioned circumstances, to provide, as its one purpose, a loop network in which out-of-step synchronization caused by a failure in a station belonging to a lobe or a subloop, out-of-step synchronization caused by a failure in a bypass and associated transmission path and out-of-step synchronization which occurs when a lobe or subloop is bypassed in a lobe or subloop branch station, are prevented from affecting the whole network through a main transmission path.

Then, the present invention is such that one control station and a number of other stations are loop-connected through a main transmission path, and at least one of the stations is a loop network comprising a branch station for coupling another station to the main transmission path as a lobe or subloop.

The branch station is provided with a frame buffer for accumulating signals from the above-mentioned lobe or subloop by the length of one frame, a frame buffer for accumlating signals from the above-mentioned main transmission path by the length of one frame, and means for selectively transmitting signals accumulated in the above-mentioned frame buffers to the main transmission path.

In accordance with this invention, in the branch station, one frame of the signal from the lobe or subloop is normally accumulated in a frame buffer and the accumulated signal is transmitted to the main transmission path. Furthermore, in the branch station, one frame of the signal from the main transmission path is accumulated in the frame buffer during an abnormal condition, such as bypass demand from the lobe branch station or bypass branch station and the occurence of failures in the lobe or subloop, before supplying it to the main transmission path. Therefore, the out-of-step condition in the lobe or subloop during an abnormal condition does not affect the entire network through the main transmission path.

BRIEF DESCRIPTION OF THE DRAWINGS

FIG. 6 is a flow chart illustrating the outline of operation of the embodiment in FIG. 5;

FIG. 7 is a diagram showing the configuration of a connector is a substrate;

DETAILED DESCRIPTION OF PREFERRED EMBODIMENTS

The present invention will be explained in the preferred embodiment form with reference to the accompanying drawings.

Figure 1:
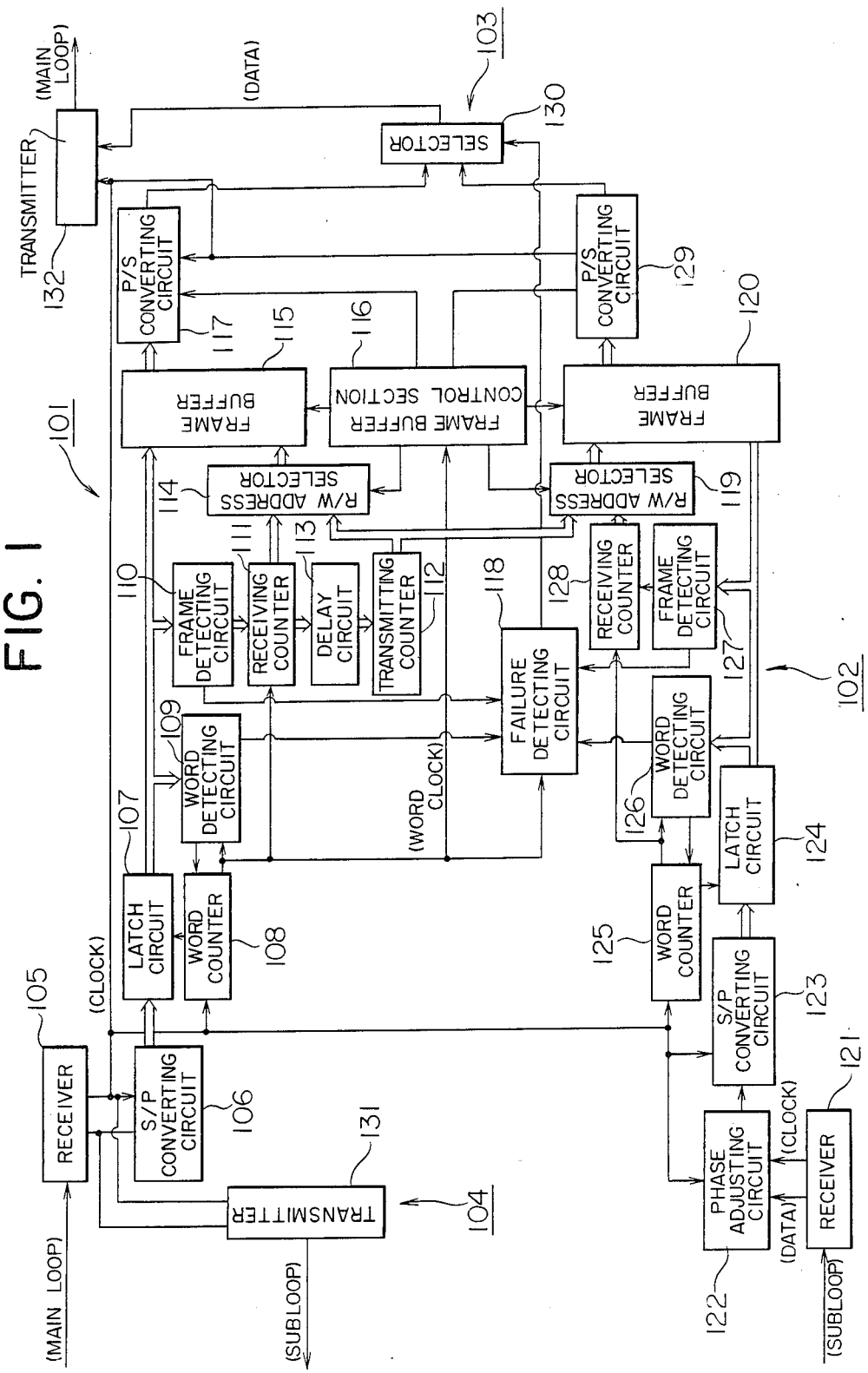
FIG. 1 is a schematic diagram showing an arrangement of a branch station of a loop network according to the first embodiment of the present invention.
Figure 9:
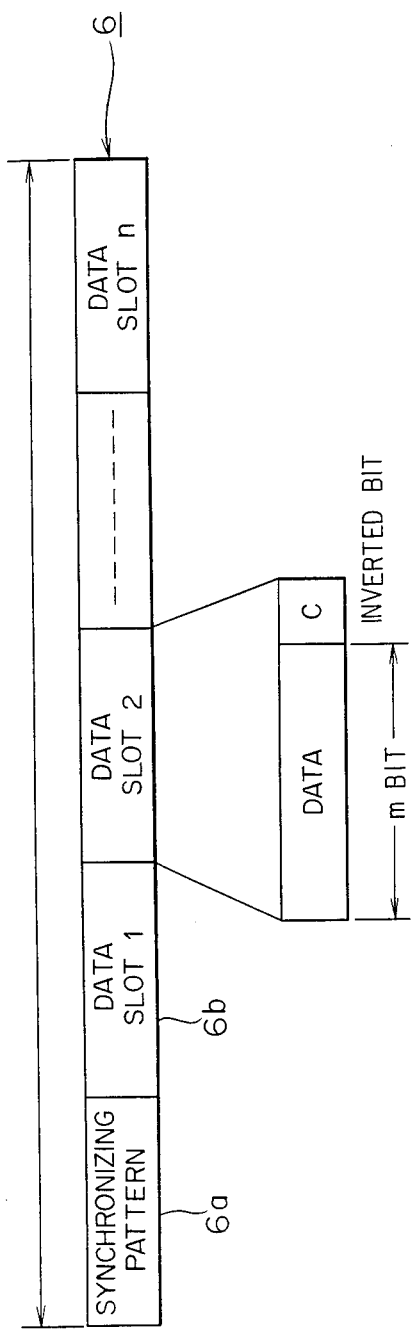
FIG. 9 is an illustration of a frame format.

FIG. 1 shows a schematic view illustrating a branch station 3 (4) incorporated a loop network relating to the first embodiment. In this figure, the format of signals passing through transmission paths in used as shown in FIG. 9, and data slots are coded with mB1C while a unique pattern of (m+1), which will not appear in the data slots, is used as the pattern of synchronization. The arrangement and operation of the above-mentioned branch station will be explained.

Branch station 3 is composed of the first signal system 101 for receiving, at its input stage, a signal from a main loop as a main transmission path, a second signal system 102 for receiving a signal from a lobe or a subloop, a bypass control system 103 for selecting these two signal system to transmit a signal to a main loop and signal transmitter system 104.

The first signal system 10 is composed of a receiver 105, a series/parallel converting circuit 106, a latch circuit 107, a word counter 108, a word detecting circuit 109, a frame detecting circuit 110, a receiving counter 111, a transmitting counter 112, a delay circuit 113, a R/W address selector 114, a frame buffer 115, a frame buffer control section 116 and a parallel/series converting circuit 117.

Receiver 105 receives a signal from the main loop, and sends a clock recovered from the signal and received data.

Series/parallel converting cicuit 106 which is a shift register having a serial input and a parallel output, receives serial data from receiver 105 and sends parallel data of (m+1) bits. Further, this series/parallel converting circuit 106 is energized with a clock transmitted from the receiver 105.

Latch circuit 107 latches parallel data of (m+1) bits sent from series/parallel converting circuit 106 with the timing given word counter 108, and sends the latched parallel data to word detecting circuit 109, frame detecting circuit 110 and frame buffer 115.

Word counter 108 which is a (m+1) step counter, delivers word clocks which are obtained by the clocks received from the receiver 105 and are frequency-divided by (m+1).

Word detecting circuit 109 has a function which detects out-of-step word synchronization in a condition such that word synchronization is established, and a function which detects the establishment of word synchronization in a condition such that out-of-step word synchronization is effected.

Further, the out-of-step word synchronization is defined as more than n non-satisfactions of the mB1C code rule by signals on a transmission path, and the word synchronization is defined as the satisfaction of the mB1C code rule repeated several times (more than n) by signals on the transmission path.

Word detecting circuit 109 incorporates two counters.

The first counter is used for detecting out-of-step word synchronization when establishing word synchronization. Word detecting circuit 109 determines that the mB1C code rule is not satisfied and makes the first counter count up when parallel data of (m+1) bits sent from latch circuit 107 is out of the complementary relationship between its m-th bit and (m+1)-th bit (complementary bit C) in the condition in which word synchronization is established. Further, when the complementary relationship between m-th bit and (m+1)-th bit (complementary bit C) is satisfied, the first counter is reset. When the counted value of the first counter exceeds n, the word detecting circuit 109 determines that word synchronization is stepped out, and therefore delivers an out-of-step word synchronization signal to a failure detecting circuit 118. Then, the mode of word synchronization is established as follows:

The second counter is used for establishing word synchronization for out-of-step word synchronization.

Word detecting circuit 109 determines that the mB1C code rule is not satisfied and resets the second counter when parallel data of (m+1) bits sent from latch circuit 107 is out of the complementary relationship between its m-th bit and (m+1) bits (complementary bit C) in the condition in which word synchronization is stepped out. At this time, word detecting circuit 109 adds one to the value set on word counter 108, resulting in a one bit shift of latch timing. This step is repeated until the complementary relationship is satisfied. Further, the second counter is allowed to count up when the complementary relationship is satisfied between m-th bit and (m+1)-th (complementary bit C). When the value set on the second counter exceeds n, word detecting circuit 109 determines that word synchronization is established, and ceases the issuance of the out-of-step word synchronization to failure detecting circuit 118. Then the mode of detection of out-of-step word synchronization is established as mentioned above.

Frame detecting circuit 110 monitors whether parallel data of (m+1) bits delivered from latch circuit 107 is coincident with a synchronizing pattern or not. Frame detecting circuit 110 resets receiving counter 111 when a synchronizing pattern is detected.

Receiving counter 111 counts word clocks and delivers the number of data time slots for the received data, which is effected by an n-step counter corresponding to the number of data slots on the frame.

Delay circuit 113 sets the value of receiving counter 111 in the first signal system 101 on transmitting counter 112 with some delay in consideration of a signal transmission delay through the lobe or subloop and the time required for detecting failures.

Transmitting counter 112 is set thereon with the number of data slots for transmitted data, from receiving counter 111 through delay circuit 113. Transmitting counter 112 delivers the number of data slots of transmitted data to R/W address selectors 114, 119 in the first and second signal systems 101, 102.

R/W address selector 114 selects the address of read/write (R/W) to frame buffer 115 under control of a frame buffer control section 116.

Frame buffer 115 accumulates data delivered from latch circuit 107 with address corresponding to the number of data slots by the length of one frame. Frame buffer 115 writes received data on the address corresponding to the number of data slot delivered from receiving counter 111, and reads out data, as transmitted data, from the address corresponding to the number of data slots delivered from the transmitting counter 112. Further, the timing of read/write is generated from a frame buffer control section 116. Frame buffer 115 is realized with a memory of data slots×(m+1) bits.

Frame buffer control section 116 generates the timing of read/write (R/W) of data on frame buffers 115, 120 in the first and second signal systems 101, 102, and controls read/write (R/W) address selector a 114, 119.

Parallel/series circuit 117 receives parallel data of (m+1) bits corresponding to the address indicated by transmitting counter 112 from frame buffer 115 with the timing generated from the frame buffer control section 116, and delivers serial data with the timing of the clock sent from receiver 105.

The second signal system 102 is composed of a receiver 121, a phase adjusting circuit 122, series/parallel converting circuit 123, a latch circuit 124, a word counter 125, a word detecting circuit 126, a frame detecting circuit 127, receiving counter 128, a R/W address selector 119, a frame buffer 120, a frame buffer control section 116 and a parallel/series converting circuit 129.

Receiver 121 receives a signal from the subloop, and sends a clock recovered from the signal and received data.

Phase adjusting circuit 122 is used to adjust a signal received by the subloop to the phase of a clock recovered from a signal from the main loop.

Series/parallel converting circuit 123 which is a shift register having a serial input and a parallel output, receives serial data from receiver 121 and outputs parallel data of (m+1) bits. Further, series/parallel converting circuit 123 is energized by clocks sent from receiver 105.

Latch circuit 124 latches parallel data of (m+1) bits sent from series/parallel converting circuit 123 with the timing given word counter 125, and sends the latched parallel data to word detecting circuit 126, frame detecting circuit 127 and frame buffer 120.

Word counter 125 which is a (m+1) step counter, delivers word clocks which are obtained by the clocks received from the receiver 105 and are frequency-divided by (m+1).

Word detecting circuit 126 has a function which detects out-of-step word synchronization in a condition such that word synchronization is established, and a function which detects the establishment of word synchronization in a condition such that out-of-step word synchronization is effected.

Further, the out-of-step word synchronization is defined as more than n non-satisfactions of the mB1C code rule by signals on a transmission path, and the word synchronization is defined as the satisfaction of the mB1C code rule repeated several times (more than n) by signals on the transmission path.

Word detecting circuit 126 incorporates two counters.

The first counter is used for detecting out-of-step word synchronization when establishing word synchronization. Word detecting circuit 126 determines that the mB1C code rule is not satisfied and makes the first counter count up when parallel data of (m+1) bits sent from latch circuit 124 is out of the complementary relationship between its m-th bit and (m+1)-th bit (complementary bit C) in the condition in which word synchronization is established. Further, when the complementary relationship between m-th bit and (m+1)-th bit (complementary bit C) is satisfied, the first counter is reset. When the counted value of the first counter exceeds n, the word detecting circuit 126 determines that word synchronization is stepped out, and therefore delivers an out-of-step word synchronization signal to a failure detecting circuit 118. Then, the mode of word synchronization is established as follows:

The second counter is used for establishing word synchronization for out-of-step word synchronization.

Word detecting circuit 126 determines that the mB1C code rule is not satisfied and resets the second counter when parallel data of (m+1) bits sent from latch circuit 124 is out of the complementary relationship between its m-th bit and (m+1) bits (complementary bit C) in the condition in which word synchronization is stepped out. At this time, word detecting circuit 126 adds one to the value set on word counter 125, resulting in a one bit shift of latch timing. This step is repeated until the complementary relationship is satisfied. Further, the second counter is allowed to count up when the complementary relationship is satisfied between m-th bit and (m+1)-th (complementary bit C). When the value set on the second counter exceeds n, word detecting circuit 126 determines that word synchronization is established, and ceases the issuance of the out-of-step word synchronization to failure detecting circuit 118. Then the mode of detection of out-of-step word synchronization is established as mentioned above.

Frame circuit 127 monitors whether parallel data of (m+1) bits delivered from latch circuit 124 is coincident with a synchronizing pattern or not. Frame detecting circuit 127 resets receiving counter 128 when a synchronizing pattern is detected.

Receiving counter 128 counts word clocks and delivers the number of data time slots for the received data, which is effected by an n-step counter corresponding to the number of data slots on the frame.

R/W address selector 119 selects the address of read/write (R/W) to frame buffer 120 under control of a frame buffer control section 116.

Frame buffer 120 accumulates data delivered from latch cicuit 124 with address corresponding to the number of data slots by the length of one frame. Frame buffer 120 writes received data on the address corresponding to the number of data slot delivered from receiving counter 128, and reads out data, as transmitted data, from the address corresponding to the number of data slots delivered from the transmitting counter 112. Further, the timing of read/write is generated from a frame buffer control section 116. Frame buffer 120 is realized with a memory of data slots×(m+1) bits.

Frame buffer control section 116 generates the timing of read/write (R/W) of data on frame buffers 115, 120 in the first and second signal systems 101, 102, and controls read/write (R/W) address selector a 114, 119.

Parallel/series circuit 129 receives parallel data of (m+1) bits corresponding to the address indicated by transmitting counter 112 from frame buffer 120 with the timing generated from the frame buffer control section 116, and delivers serial data with the timing of the clock sent from receiver 105.

The bypass control system 103 is composed of failure detecting circuit 118 and selector 130.

Failure detecting circuit 118 detects out-of-step word synchronization in accordance with an out-of-step word synchronization signal from word detecting circuits 109, 126. Further, failure detecting circuit 118 monitors the timing with which receiving counters 111, 128 in frame detecting circuits 110, 127 are reset. When this timing becomes irregular, the failure detecting circuit 118 determines that out-of-step frame synchronization has occured. Failure detecting circuit 118 includes a counter for counting word clocks delivered from the timing first signal system 101, and resets this counter with the timing of frame detection. If the value of this counter exceeds the maximum value among data slot numbers without being reset, out-of-step frame synchronization is detected. Failure detecting circuit 118 controls selector 130 in association with the detection of out-of-step word synchronization and out-of-step frame synchronization.

Transmitter 131 transmits a signal delivered from the main loop, to the subloop. Transmitter 131 receives data and clocks from receiver 105, and transmits a signal to the subloop.

Transmitter 132 transmits clocks from receiver 105, and data sent from selector 130, to the main loop.

The following explanation refers to the operation of branch station 3 (4).

The first signal system 101 receives a signal from the main loop through receiver 105, and takes this signal into latch circuit 107 through series/parallel converting circuit 106. Word detecting circuit 109 detects a word taken in latch circuit 107, and frame detecting circuit 110 detects a frame, word synchronization and frame synchronization are thereby established. Frame buffer control section 116 generates the timing with which received data are written in frame buffer 115.

Meanwhile, a second signal system 102 receives a signal from the subloop through receiver 121, adjusting the signal in phase adjusting circuit 122 to the phase of clocks recovered from received data by receiver 105, and takes this signal to latch circuit 124 through series/parallel converting circuit 123. Word detecting circuit 126 detects a word from this received data taken in latch circuit 124, and frame detecting circuit 127 detects a frame, word synchronization and frame synchronization are thereby established. Frame buffer control section 116 generates the timing with which received data is written in frame buffer 120.

Thus, in the first and second signal system 101, 102, signals from the main loop and signals from the subloop are accumulated independently from each other, in frame buffers 115, 120, respectively. The read-out from frame buffers 115, 120 is made in consideration of the timing delay in the transmission of a signal from the subloop and the timing of failures thereof. Further, data accumulated in frame buffers 115, 120 are read out to the parallel/series converting circuit 117 with the timing generated from buffer control section 116 from an address corresponding to the data slot numbers indicated by transmitting counters 111, 128. Further, data are selected by selector 130 in the bypass control system 103, and are transmitted to the main loop from transmitter 132.

Failure detecting circuit 118 performs the detecting operation of the above-mentioned selector 130. That is, when out-of-step word synchronization or out-of-step frame synchronization is detected, failure detecting circuit 118 changes over the selector 130 to the bypass side (the first signal system 101 side).

Thus, in the subloop branch station constituted as mentioned above, a signal from the subloop, which is always received by the second signal system 102 and accumulated in buffer 120 is selected by selector 130 and is transmitted to the next stage station.

Meanwhile, if signals which do not satisfy the mB1C code rule are successively generated or if a frame synchronizing pattern disappears, failure detecting circuit 118 changes over the selecting system of selector 130.

As a result, signals are received by the first signal system 101 and are accumulated in frame buffer 115, from which signals are transmitted to the main loop through parallel/series converting circuit 117. That is, signals which are transmitted without being led through the subloop are selected by selector 130. Further, since read-out in frame buffer 115 and frame buffer 120 is carried out in synchronization with frames, these signals to be led through the main loop can be returned to the main loop without being missed. Accordingly, even if there are errors in signals due to a failure in the subloop and a part of data is missed, received data from the main loop, instead of the afore-mentioned data, are transmitted in synchronization with the timing of the afore-mentioned signal. Therefore, the next stage can ensure the establishment of word synchronization and frame synchronization. Thus, neither out-of-step word synchronization nor out-of-step frame synchronization caused by a failure in the subloop affects the main loop, it is thereby possible to effectively prevent these out-of-step synchronizations from affecting the entire network.

Figure 2:
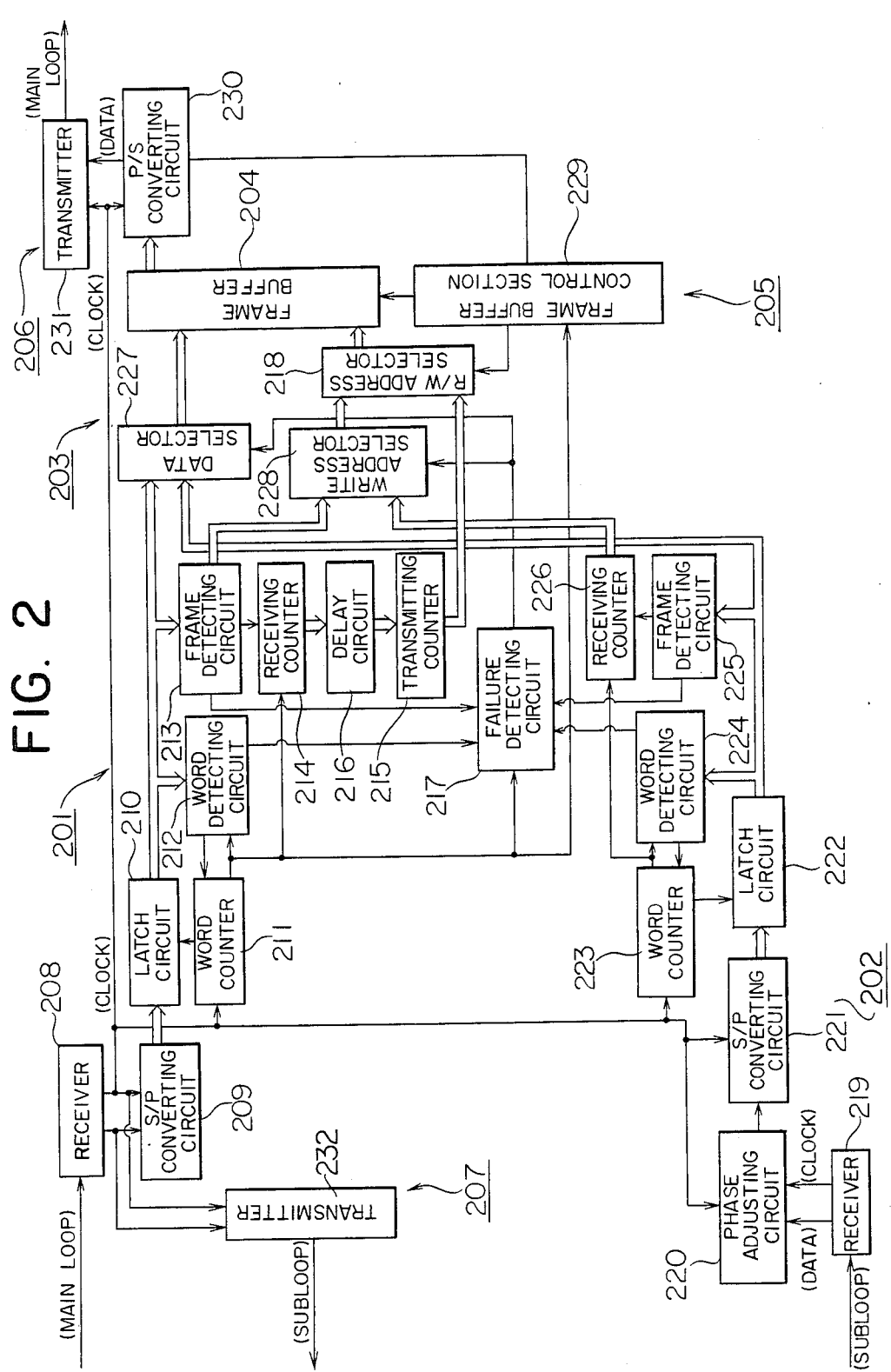
FIGS. 2 through 5 are schematic diagrams showing arrangements of branch station of loop networks according to further embodiments of the present invention.

FIG. 2 shows a schematic view illustrating a branch station 3 (4) incorporated a loop network relating to the second embodiment. In this figure, the format of signals passing through transmission paths in used as shown in FIG. 9, and data slots are coded with mB1C while a unique pattern of (m+1), which will not appear in the data slots, is used as the pattern of synchronization. The arrangement and operation of the above-mentioned branch station will be explained.

Branch station 3 is composed of the first receiving system 201 for receiving, at its input stage, a signal from a main loop as a main transmission path, a second receiving system 202 for receiving a signal from a lobe or a subloop, a bypass control system 203 for selecting these two signal system to write a signal to frame buffer, a frame buffer 204, a frame buffer control system 205, first transmitter system 206 for transmitting a signal to a main loop and second transmitter system 207 for transmitting a signal to subloop.

The first receiving system 201 is composed of a receiver 208, a series/parallel converting circuit 209, a latch circuit 210, a word counter 211, a word detecting circuit 212, a frame detecting circuit 213, a receiving counter 214, a transmitting counter 215 and a delay circuit 216.

Receiver 208 receives a signal from the main loop, and sends a clock recovered from the signal and received data.

A series/parallel converting circuit 209 which is a shift register having a serial input and a parallel output, receives serial data from receiver 208 and sends parallel data of $(m+1)$ bits. Further, this series/parallel converting cicuit 209 is energized with a clock transmitted from the receiver 208.

Latch circuit 210 latches parallel data of $(m+1)$ bits sent from series/parallel converting circuit 209 with the timing given word counter 211, and sends the latched parallel data to word detecting circuit 212, frame detecting circuit 213 and frame buffer 204.

Word counter 211 which is a $(m+1)$ step counter, delivers word clocks which are obtained by the clocks received from the receiver 208 and are frequency-divided by $(m+1)$.

Word detecting circuit 212 has a function which detects out-of-step word synchronization in a condition such that word synchronization is established, and a function which detects the establishment of word synchronization in a condition such that out-of-step word synchronization is effected.

Further, the out-of-step word synchronization is defined as more than n non-satisfactions of the mB1C code rule by signals on a transmission path, and the word synchronization is defined as the satisfaction of the mB1C code rule repeated several times (more than n) by signals on the transmission path.

Word detecting circuit 212 incorporates two counters.

The first counter is used for detecting out-of-step word synchronization when establishing word synchronization. Word detecting circuit 212 determines that the mB1C code rule is not satisfied and makes the first counter count up when parallel data of $(m+1)$ bits sent from latch circuit 210 is out of the complementary relationship between its m-th bit and $(m+1)$-th bit (complementary bit C) in the condition in which word synchronization is established. Further, when the complementary relationship between m-th bit and $(m+1)$-th bit (complementary bit C) is satisfied, the first counter is reset. When the counted value of the first counter exceeds n, the word detecting circuit 212 determines that word synchronization is stepped out, and therefore delivers an out-of-step word synchronization signal to a failure detecting circuit 217. Then, the mode of word synchronization is established as follows:

The second counter is used for establishing word synchronization for out-of-step word synchronization.

Word detecting circuit 212 determines that the mB1C code rule is not satisfied and resets the second counter when parallel data of $(m+1)$ bits sent from latch circuit 210 is out of the complementary relationship between its m-th bit and $(m+1)$ bits (complementary bit C) in the condition in which word synchronization is stepped out. At this time, word detecting circuit 212 adds one to the value set on word counter 211, resulting in a one bit shift of latch timing. This step is repeated until the complementary relationship is satisfied. Further, the second counter is allowed to count up when the complementary relationship is satisfied between m-th bit and $(m+1)$-th (complementary bit C). When the value set on the second counter exceeds n, word detecting circuit 212 determines that word synchronization is established, and ceases the issuance of the out-of-step word synchronization to failure detecting circuit 217. Then the mode of detection of out-of-step word synchronization is established as mentioned above.

Frame detecting circuit 213 monitors whether parallel data of $(m+1)$ bits delivered from latch circuit 210 is coincident with a synchronizing pattern or not. Frame detecting circuit 213 resets receiving counter 214 when a synchronizing pattern is detected.

Receiving counter 214 counts word clocks and delivers the number of data time slots for the received data, which is effected by an n-step counter corresponding to the number of data slots on the frame.

Delay circuit 216 sets the value of receiving counter 214 in the first signal system 201 on transmitting counter 215 with some delay in consideration of a signal transmission delay through the subloop and the time required for detecting failures.

Transmitting counter 215 is set thereon with the number of data slots for transmitted data, from receiving counter 214 through delay circuit 216. Transmitting counter 215 delivers the number of data slots of transmitted data to R/W address selectors 218.

The second signal system 202 is composed of receiver 219, a phase adjusting circuit 220, series/parallel converting circuit 221, a latch circuit 222, a word counter 223, a word detecting circuit 224, a frame detecting circuit 225 and receiving counter 226.

Receiver 219 receives a signal from the subloop, and sends a clock recovered from the signal and received data.

Phase adjusting circuit 220 is used to adjust a signal received by the subloop to the phase of a clock recovered from a signal from the main loop.

Series/parallel converting circuit 221 which is a shift register having a serial input and a parallel output, receives serial data from receiver 219 and outputs parallel data of $(m+1)$ bits. Further, series/parallel converting circuit 221 is energized by clocks sent from receiver 208.

Latch circuit 222 latches parallel data of $(m+1)$ bits sent from series/parallel converting circuit 221 with the timing given word counter 223, and sends the latched parallel data to word detecting circuit 224, frame detecting circuit 225 and frame buffer 204.

Word counter 223 which is a $(m+1)$ step counter, delivers word clocks which are obtained by the clocks received from the receiver 208 and are frequency-divided by $(m+1)$.

Word detecting circuit 224 has a function which detects out-of-step word synchronization in a condition such that word synchronization is established, and a function which detects the establishment of word synchronization in a condition such that out-of-step word synchronization is effected.

Further, the out-of-step word synchronization is defined as more than n non-satisfactions of the mB1C code rule by signals on a transmission path, and the word synchronization is defined as the satisfaction of the mB1C code rule repeated several times (more than n) by signals on the transmission path.

Word detecting circuit 224 incorporates two counters.

The first counter is used for detecting out-of-step word synchronization when establishing word synchronization. Word detecting circuit 224 determines that the mB1C code rule is not satisfied and makes the first counter count up when parallel data of (m+1) bits sent from latch circuit 222 is out of the complementary relationship between its m-th bit and (m+1)-th bit (complementary bit C) in the condition in which word synchronization is established. Further, when the complementary relationship between m-th bit and (m+1)-th bit (complementary bit C) is satisfied, the first counter is reset. When the counted value of the first counter exceds n, the word detecting circuit 224 determines that word synchronization is stepped out, and therefore delivers an out-of-step word synchronization signal to a failure detecting circuit 217. Then, the mode of word synchronization is established as follows:

The second counter is used for establishing word synchronization for out-of-step word synchronization.

Word detecting circuit 224 determines that the mB1C code rule is not satisfied and resets the second counter when parallel data of (m+1) bits sent from latch circuit 222 is out of the complementary relationship betwen its m-th bit and (m+1) bits (complementary bit C) in the condition ih which word synchronization is stepped out. At this time, word detecting circuit 224 adds one to the value set on word counter 223, resulting in a one bit shift of latch timing. This step is repeated until the complementary relationship is satisfied. Further, the second counter is allowed to count up when the complementary relationship is satisfied between m-th bit and (m+1)-th (complementary bit C). When the value set on the second counter exceeds n, word detecting circuit 224 determines that word synchronization is established, and ceases the issuance of the out-of-step word synchronization to failure detecting ircuit 217. Then the mode of detection of out-of-step word synchronization is established as mentioned above.

Frame detecting circuit 225 monitors whether parallel data of (m+1) bits delivered from latch circuit 222 is coincident with a synchronizing pattern or not. Frame detecting circuit 225 resets receiving counter 226 when a synchronizing pattern is detected.

Receiving counter 226 counts word clocks and delivers the number of data time slots for the received data, which is effected by an n-step counter corresponding to the number of data slots on the frame.

The bypass control system 203 is composed of failure detecting circuit 217, data selector 227 and write address selector 228.

Failure detecting circuit 217 detects out-of-step word synchronization in accordance with an out-of-step word synchronization signal from word detecting circuits 212, 224. Further, failure detecting circuit 217 monitors the timing with which receiving counters 214, 226 in frame detecting circuits 213, 225 are reset. When this timing becomes irregular, the failure detecting circuit determines that out-of-step frame synchronization has occured. Failure detecting circuit 217 includes a counter for counting word clocks delivered from the timing first received by system 201, and resets this counter with the timing of frame detection. If the value of this counter exceeds the maximum value among data slot numbers without being reset, out-of-step frame synchronization is detected. Failure detecting circuit 217 controls data selector 227 and write address selector 228 in association with the detection of out-of-step word synchronization and out-of-step frame synchronization.

Frame buffer 204 accumulates data delivered from latch circuit 210, 222 through data selector 227 with address corresponding to the number of data slots by the length of one frame. Frame buffer 204 writes received data on the address corresponding to the number of data slot delivered from receiving counter 214, 226, and reads out data, as transmitted data, from the address corresponding to the number of data slots delivered from the transmitting counter 215. Further, the timing of read/write is generated from a frame buffer control section 229. Frame buffer 204 is realized with a memory of data slots $\times$ (m+1) bits.

Frame buffer control system 205 is composed of frame buffer control section 229 and R/W address selector 218.

Frame buffer control section 229 generates the timing of read/write (R/W) of data on frame buffers 204 and selects read/write (R/W) address.

R/W address selector 218 selects the address of read/write (R/W) to frame buffer 204 under control of a frame buffer control section 229.

First transmitting system 206 is composed of parallel/series converting circuit 230 and transmitter 231.

Parallel/series circuit 230 receives parallel data of (m+1) bits corresponding to the address indicated by transmitting counter 215 from frame buffer 204 with the timing generated from the frame buffer control section 229, and delivers serial data with the timing of the clock sent from receiver 208.

Transmitter 231 transmits serial data delivered from parallel/series converting circuit 230 to the main loop with the timing of clocks delivered from receiver 208.

Second transmitting system 207 is composed of transmitter 232.

Transmitter 232 transmits a signal delivered from the main loop, to the subloop. Transmitter 232 receives data and clocks from receiver 208, and transmits a signal to the subloop.

The following explanation refers to the operation of branch station 3 (4).

The first receiving system 201 receives a signal from the main loop through receiver 208, and takes this signal into latch circuit 210 through series/parallel converting circuit 209. Word detecting circuit 212 detects a word taken in latch circuit 210, and frame detecting circuit 213 detects a frame, word synchronization and frame synchronization are thereby established. Frame buffer control section 229 generates the timing with which received data are written in frame buffer 204.

Meanwhile, a second receiving system 202 receives a signal from the subloop through receiver 219, adjusting the signal in phase adjusting circuit 220 to the phase of clocks recovered from received data by receiver 208, and takes this signal to latch circuit 222 through series/parallel converting circuit 221. Word detecting circuit 224 detects a word from this received data taken in latch circuit 222, and frame detecting circuit 225 detects a frame, word synchronization and frame synchronization are thereby established. Frame buffer control section 229 generates the timing with which received data is written in frame buffer 204.

Thus, in the first and second receiving system 201, 202, signals from the main loop and signals from the subloop are accumulated independently from each other, in frame buffer 204. The read-out from frame buffer 204 is made in consideration of the timing delay in the transmission of a signal from the subloop and the timing of failures thereof. Further, data accumulated in frame buffer 204 are read out to the parallel/series converting circuit 230 with the timing generated from buffer control section 229 from an address corresponding to the data slot numbers indicated by transmitting counter 215, and transmitted to the main loop from transmiiter 231.

Failure detecting circuit 217 performs the detecting operation of the above-mentioned data selector 227 and write address selector 228. That is, when out-of-step word synchronization or out-of-step frame synchronization is detected, failure detecting circuit 217 changes over the data selector 227 and write address selector 228 to the bypass side (the first receiving system 201 side).

Thus, in the subloop branch section constituted as mentioned above, a signal from the subloop, which is always received by the second receiving system 202 and accumulated in frame buffer 204 is selected by selector and is transmitted to the next stage station.

Meanwhile, if signals which do not satisfy the mB1C code rule are successively generated or if a frame synchronizing pattern disappears, failure detecting circuit 217 changes over the selecting system of selector.

As a result, signals are received by the first receiving system 201 and are accumulated in frame buffer 204, from which signals are transmitted to the main loop through parallel/series converting circuit 230. That is, signals which are transmitted without being led through the subloop are selected by selector 227. Further, since read-out from frame buffer 204 is carried out in synchronization with frames, these signals to be led through the main loop can be returned to the main loop without being missed. Accordingly, even if there are errors in signals due to a failure in the subloop and a part of data is missed, received data from the main loop, instead of the afore-mentioned data, are transmitted in synchronization with the timing of the afore-mentioned signal. Therefore, the next stage can ensure the establishment of word synchronization and frame synchronization. Thus, neither out-of-step word synchronization nor out-of-step frame synchronization caused by a failure in the subloop affects the main loop, it is thereby possible to effectively prevent these out-of-step synchronizations from affecting the entire network.

Figure 3:
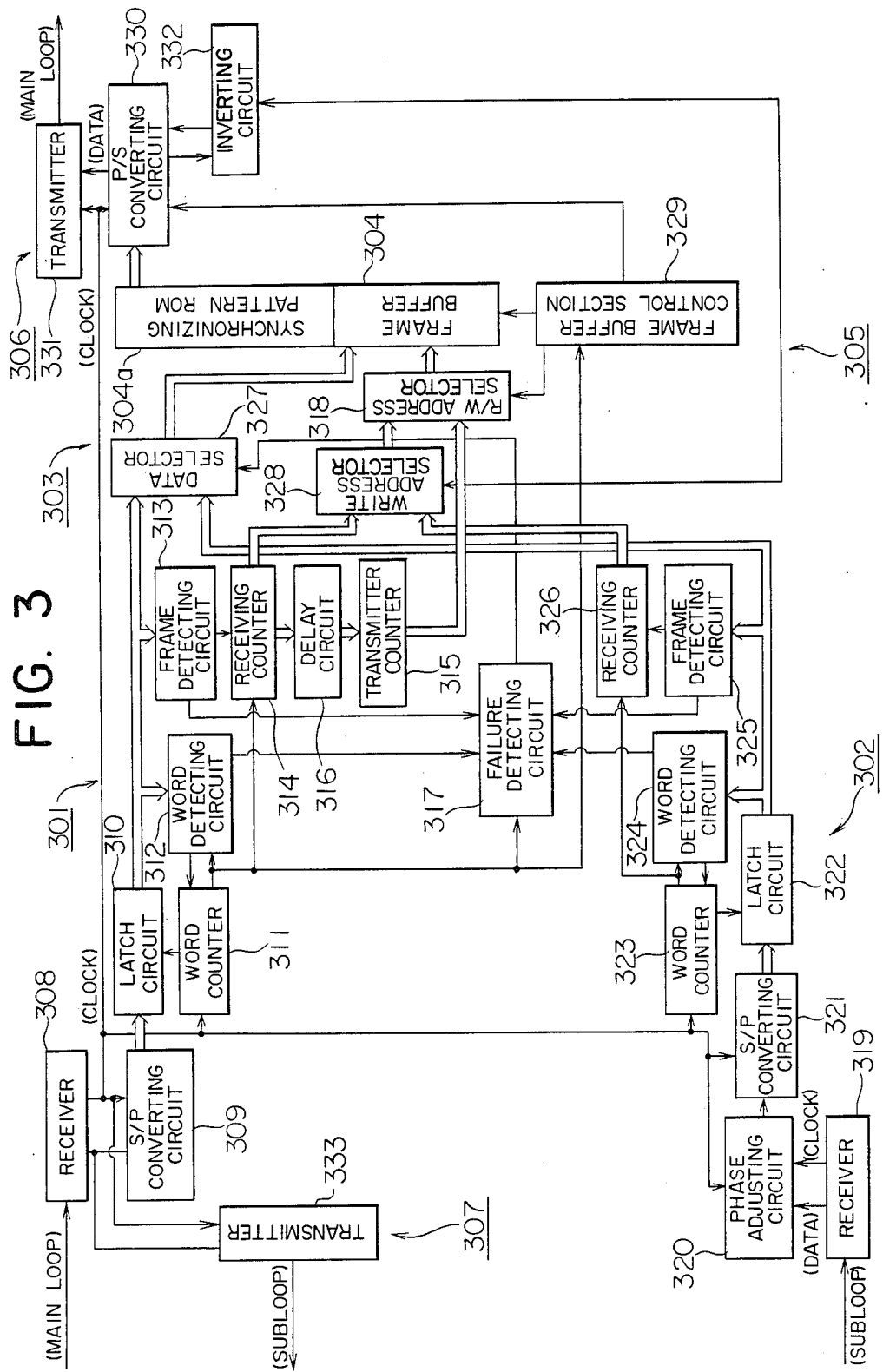

FIG. 3 shows a schematic view illustrating a branch station 3 (4) incorporated a loop network relating to the third embodiment. In this figure, the format of signals passing through transmission paths in used as shown in FIG. 9, and data slots are coded with mB1C while a unique pattern of (m−1), which will not appear in the data slots, is used as the pattern of synchronization. The arrangement and operation of the above-mentioned branch station will be explained.

Branch station 3 is composed of the first receiving system 301 for receiving, at its input stage, a signal from a main loop as a main transmission path, a second receiving system 302 for receiving a signal from a lobe or a subloop, a bypass control system 303 for selecting these two signal system to write a signal to frame buffer, a frame buffer 304, a frame buffer control system 305, first transmitter system 306 for transmitting a signal to a main loop and second transmitter system 307 for transmitting a signal to subloop.

The first receiving system 301 is composed of a receiver 308, a series/parallel converting circuit 309, a latch circuit 310, a word counter 311, a word detecting circuit 312, a frame detecting circuit 313, a receiving counter 314, a transmitting counter 315 and a delay circuit 316.

Receiver 308 receives a signal from the main loop, and sends a clock recovered from the signal and received data.

Series/parallel converting circuit 309 which is a shift register having a serial input and a parallel output, receives serial data from receiver 308 and sends parallel data of (m+1) bits. Further, this series/parallel converting circuit 309 is energized with a clock transmitted from the receiver 308.

Latch circuit 310 latches parallel data of (m+1) bits sent from series/parallel converting circuit 309 with the timing given word counter 311, and sends the latched parallel data to word detecting circuit 312, frame detecting circuit 313 and frame buffer 304.

Word counter 311 which is a (m+1) step counter, delivers word clocks which are obtained by the clocks received from the receiver 308 and are frequency-divided by (m+1).

Word detecting circuit 312 has a function which detects out-of-step word synchronization in a condition such that word synchronization is established, and a function which detects the establishment of word synchronization in a condition such that out-of-step word synchronization is effected.

Further, the out-of-step word synchronization is defined as more than n non-satisfactions of the mB1C code rule by signals on a transmission path, and the word synchronization is defined as the satisfaction of the mB1C code rule repeated several times (more than n) by signals on the transmission path.

Word detecting circuit 312 incorporates two counters.

The first counter is used for detecting out-of-step word synchronization when establishing word synchronization. Word detecting circuit 312 determines that the mB1C code rule is not satisfied and makes the first counter count up when parallel data of (m+1) bits sent from latch circuit 310 is out of the complementary relationship between its m-th bit and (m+1)-th bit (complementary bit C) in the condition in which word synchronization is established. Further, when the complementary relationship between m-th bit and (m+1)-th bit (complementary bit C) is satisfied, the first counter is reset. When the counted value of the first counter exceeds n, the word detecting circuit 312 determines that word synchronization is stepped out, and therefore delivers an out-of-step word synchronization signal to a failure detecting circuit 317. Then, the mode of word synchronization is established as follows:

The second counter is used for establishing word synchronization for out-of-step word synchronization. Word detecting circuit 312 determines that the mB1C code rule is not satisfied and resets the second counter when parallel data of (m+1) bits sent from latch circuit 310 is out of the complementary relationship between its m-th bit and (m+1) bits (complementary bit C) in the condition in which word synchronization is stepped out. At this time, word detecting circuit 312 adds one to the value set on word counter 311, resulting in a one bit shift of latch timing. This step is repeated until the complementary relationship is satisfied. Further, the second counter is allowed to count up when the complementary relationship is satisfied between m-th bit and (m+1)-th (complementary bit C). When the value set on the second counter exceeds n, word detecting circuit 312 determines that word synchronization is established, and ceases the issuance of the out-of-step word synchronization to failure detecting circuit 317. Then the mode of detection of out-of-step word synchronization is established as mentioned above.

Frame detecting circuit 313 monitors whether parallel data of (m+1) bits delivered from latch circuit 310 is coincident with a synchronizing pattern or not. Frame detecting circuit 313 resets receiving counter 314 when a synchronizing pattern is detected.

Receiving counter 314 counts word clocks and delivers the number of data time slots for the received data, which is effected by an n-step counter corresponding to the number of data slots on the frame.

Delay circuit 316 sets the value of receiving counter 314 in the first signal system 301 on transmitting counter 315 with some delay in consideration of a signal transmission delay through the subloop and the time required for detecting failures.

Transmitting counter 315 is set thereon with the number of data slots for transmitted data, from receiving counter 314 through delay circuit 316. Transmitting counter 315 delivers the number of data slots of transmitted data to R/W address selectors 318.

The second receiving system 302 is composed of a receiver 319, a phase adjusting circuit 320, series/parallel converting circuit 321, a latch circuit 322, a word counter 323, a word detecting circuit 324, a frame detecting circuit 325 and receiving counter 326.

Receiver 319 receives a signal from the subloop, and sends a clock recovered from the signal and received data.

Phase adjusting circuit 320 is used to adjust a signal received by the subloop to the phase of a clock recovered from a signal from the main loop.

Series/parallel converting circuit 321 which is a shift register having a serial input and a parallel output, receives serial data from receiver 319 and outputs parallel data of (m+1) bits. Further, series/parallel converting circuit 321 is energized by clocks sent from receiver 308.

Latch circuit 322 latches parallel data of (m+1) bits sent from series/parallel converting circuit 321 with the timing given word counter 323, and sends the latched parallel data to word detecting circuit 324, frame detecting circuit 325 and frame buffer 304.

Word counter 323 which is a (m+1) step counter, delivers word clocks which are obtained by the clocks received from the receiver 308 and are frequency-divided by (m+1).

Word detecting circuit 324 has a function which detects out-of-step word synchronization in a condition such that word synchronization is established, and a function which detects the establishment of word synchronization in a condition such that out-of-step word synchronization is effected.

Further, the out-of-step word synchronization is defined as more than n non-satisfactions of the mB1C code rule by signals on a transmission path, and the word synchronization is defined as the satisfaction of the mB1C code rule repeated several times (more than n) by signals on the transmission path.

Word detecting circuit 324 incorporates two counters.

The first counter is used for detecting out-of-step word synchronization when establishing word synchronization. Word detecting circuit 324 determines that the mB1C code rule is not satisfied and makes the first counter count up when parallel data of (m+1) bits sent from latch circuit 322 is out of the complementary relationship between its m-th bit and (m+1)-th bit (complementary bit C) in the condition in which word synchronization is established. Further, when the complementary relationship between m-th bit and (m+1)-th bit (complementary bit C) is satisfied, the first counter is reset. When the counted value of the first counter exceeds n, the word detecting circuit 324 determines that word synchronization is stepped out, and therefore delivers an out-of-step word synchronization signal to a failure detecting circuit 317. Then, the mode of word synchronization is established as follows:

The second counter is used for establishing word synchronization for out-of-step word synchronization.

Word detecting circuit 324 determines that the mB1C code rule is not satisfied and resets the second counter when parallel data of (m+1) bits sent from latch circuit 322 is out of the complementary relationship between its m-th bit and (m+1) bits (complementary bit C) in the condition in which word synchronization is stepped out. At this time, word detecting circuit 324 adds one to the value set on word counter 323, resulting in a one bit shift of latch timing. This step is repeated until the complementary relationship is satisfied. Further, the second counter is allowed to count up when the complementary relationship is satisfied between m-th bit and (m+1)-th (complementary bit C). When the value set on the second counter exceeds n, word detecting circuit 324 determines that word synchronization is established, and ceases the issuance of the out-of-step word synchronization to failure detecting circuit 317. Then the mode of detection of out-of-step word synchronization is established as mentioned above.

Frame detecting circuit 325 monitors whether parallel data of (m+1) bits delivered from latch circuit 322 is coincident with a synchronizing pattern or not. Frame detecting circuit 325 resets receiving counter 326 when a synchronizing pattern is detected.

Receiving counter 326 counts word clocks and delivers the number of data time slots for the received data, which is effected by an n-step counter corresponding to the number of data slots on the frame.

The bypass control system 303 is composed of failure detecting circuit 317, data selector 327 and write address selector 328.

Failure detecting circuit 317 detects out-of-step word synchronization in accordance with an out-of-step word synchronization signal from word detecting circuits 312, 324. Further, failure detecting circuit 317 monitors the timing with which receiving counters 314, 326 in frame detecting circuits 313, 325 are reset. When this timing becomes irregular, the failure detecting circuit determines that out-of-step frame synchronization has occured. Failure detecting circuit 317 includes a counter for counting word clocks delivered from the timing first received by system 301, and resets this counter with the timing of frame detection. If the value of this counter exceeds the maximum value among data slot numbers without being reset, out-of-step frame synchronization is detected. Failure detecting circuit 317 controls data selector 327 and write address selector 328 in association with the detection of out-of-step word synchronization and out-of-step frame synchronization.

Frame buffer 304 comprises a synchronized pattern generating ROM 304a which generates synchronized pattern. This ROM remembers fixed synchronized patterns and transmits the patterns to parallel/series converting circuit 330 in a timing generated by frame buffer control section 329 when the number of data slots in region of the pattern is indicated by transmitting counter 315.

Frame buffer 304 accumulates data delivered from latch circuit 310, 322 through data selector 327 with address corresponding to the number of data slots by the length of one frame. Frame buffer 304 writes received data on the address corresponding to the number of data slot delivered from receivng counter 314, 326, and reads out data, as transmitted data, from the address corresponding to the number of data slots delivered from the transmitting counter 315. Further, the timing of read/write is generated from a frame buffer control section 329. Frame buffer 304 is realized with a memory of data slots×(m+1) bits.

Frame buffer control system 305 is composed of frame buffer control section 329 and R/W address selector 318.

Frame buffer control section 329 generates the timing of read/write (R/W) of data on frame buffer 304 and selects read/write (R/W) address.

R/W address selector 318 selects the address of read/write (R/W) to frame buffer 304 under control of a frame buffer control section 329.

First transmitting system 306 is composed of parallel/series converting circuit 330, transmitter 331 and inverting circuit 332.

Parallel/series converting circuit 330 receives parallel data of (m+1) bits corresponding to the address indicated by transmitting counter 315 from frame buffer 304 with the timing generated from the frame buffer control section 329, and delivers serial data with the timing of the clock sent from receiver 331.

Inverting circuit 332 inverts m-th bit of a parallel/series circuit 330 and writes in (m+1)-th bit. That is, circuit 332 compensates signals which do not satisfy the mB1C code rule and which are not detected by failure detecting circuit 317. Further, circuit 332 also compensates signals which are detected by failure detecting circuit 317 as those not satisfying the mB1C code rule. (a failure is detected by plural successive signals which do not satisfy the mB1C code rule, these signals are temporarily written in frame buffer 304.)

Second transmitting system 307 is composed of transmitter 333.

Transmitter 333 transmits a signal delivered from the main loop, to the subloop. Transmitter 333 receives data and clocks from receiver 308, and transmits a signal to the subloop.

The following explanation refers to the operation of branch station 3 (4).

The first receiving system 301 receives a signal from the main loop through receiver 308, and takes this signal into latch circuit 310 through series/parallel converting circuit 309. Word detecting circuit 312 detects a word taken in latch circuit 310, and frame detecting circuit 313 detects a frame, word synchronization and frame synchronization are thereby established. Frame buffer control section 329 generates the timing with which received data are written in frame buffer 304.

Meanwhile, a second receiving system 302 receives a signal from the subloop through receiver 319, adjusting the signal in phase adjusting circuit 320 to the phase of clocks recovered from receivded data by receiver 308, and takes this signal to latch circuit 322 through series/parallel converting circuit 321. Word detecting circuit 324 detects a word from this received data taken in latch circuit 322, and frame detecting circuit 325 detects a frame, word synchronization and frame synchronization are thereby established. Frame buffer control section 329 generates the timing with which received data is written in frame buffer 304.

Thus, in the first and second receiving system 301, 302, signals from the main loop and signals from the subloop are accumulated independently from each other, in frame buffer 304. The read-out from frame buffer 304 is made in consideration of the timing delay in the transmission of a signal from the subloop and the timing of failures thereof. Further, data accumulated in frame buffer 304 are read out to the parallel/series converting circuit 330 with the timing generated from buffer control section 329 from an address corresponding to the data slot numbers indicated by transmitting counter 315, and transmitted to the main loop from transmitter 331.

Failure detecting circuit 317 performs the detecting operation of the above-mentioned data selector 327 and write address selector 328. That is, when out-of-step word synchronization or out-of-step frame synchronization is detected, failure detecting circuit 317 changes over the data selector 327 and write address selector 328 to the bypass side (the first receiving system 301 side).

Thus, in the subloop branch station constituted as mentioned above, a signal from the subloop, which is always received by the second receiving system 302 and accumulated in frame buffer 304 is selected by selector and is transmitted to the next stage station.

Meanwhile, if signals which do not satisfy the mB1C code rule are successively generated or if a frame synchronizing pattern disappears, failure detecting circuit 317 changes over the selecting system of selector.

As a result, signals are received by the first receiving system 301 and are accumulated in frame buffer 304, from which signals are transmitted to the main loop through parallel/series converting circuit 330. That is, signals which are transmitted without being led through the subloop are selected by selector. Further, since read-out in frame buffer 304 is carried out in synchronization with frames, these signals to be led through the main loop can be returned to the main loop without being missed. Accordingly, even if there are errors in signals due to a failure in the subloop and a part of data is missed, received data from the main loop, instead of the afore-mentioned data, are transmitted in synchronization with the timing of the afore-mentioned signal. Therefore, the next stage can ensure the establishment of word synchronization and frame synchronization. Thus, neither out-of-step word synchronization nor out-of-step frame synchronization caused by a failure in the subloop affects the main loop, it is thereby possible to effectively prevent these out-of-step synchronizations from affecting the entire network.

Figure 4:
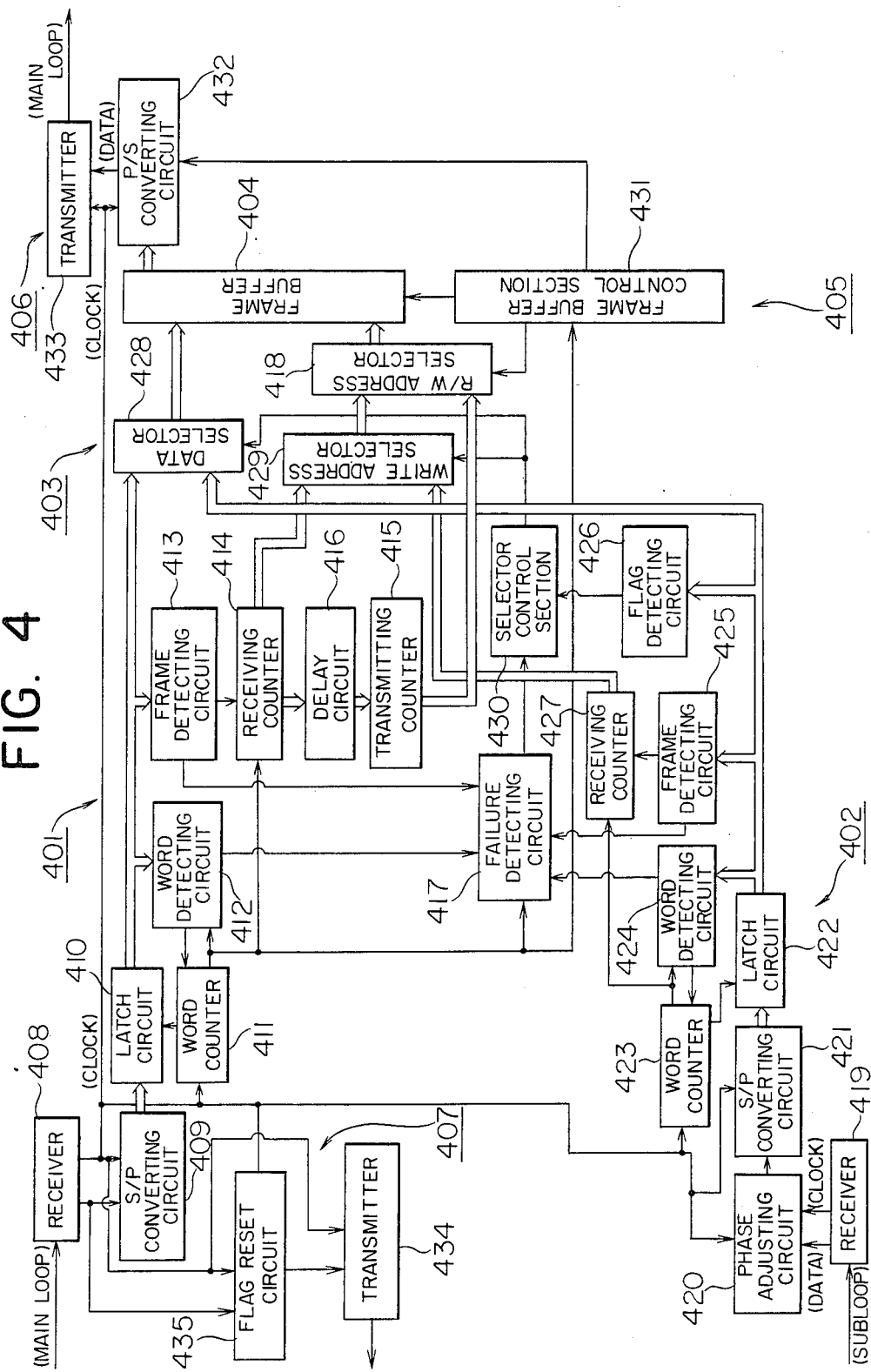

FIG. 4 shows a schematic view illustrating a branch station 3 (4) incorporated a loop network relating to the fourth embodiment. In this figure, the format of signals passing through transmission paths in used as shown in FIG. 9, and data slots are coded with mB1C while a unique pattern of (m+1), the first m-th bit of m-th bits is divided a flag, which will not appear in the data slots, is used as the pattern of synchronization. The arrangement and operation of the above-mentioned branch station will be explained.

Here, stations $3a$, $3b$,---$3n$ have a function for setting a flag of the first bit of data slots and set a flag when transmitting (when data slot is used).

Branch station 3 is composed of the first receiving system 401 for receiving, at its input stage, a signal from a main loop as a main transmission path, a second receiving system 402 for receiving a signal from a lobe or a subloop, a bypass control system 403 for selecting these two signal system to write a signal to frame buffer, a frame buffer 404, a frame buffer control system 405, first transmitter system 406 for transmitting a signal to a main loop and second transmitter system 407 for transmitting a signal to subloop.

The first receiving system 401 is composed of a receiver 408, a series/parallel converting circuit 409, a latch circuit 410, a word counter 411, a word detecting circuit 412, a frame detecting circuit 413, a receiving counter 414, a transmitting counter 415 and a delay circuit 416.

Receiver 408 receives a signal from the main loop, and sends a clock recovered from the signal and received data.

A series/parallel converting circuit 409 which is a shift register having a serial input and a parallel output, receives serial data from receiver 408 and sends parallel data of (m+1) bits. Further, this series/parallel converting circuit 409 is energized with a clock transmitted from the receiver 408.

Latch circuit 410 latches parallel data of (m+1) bits sent from series/parallel converting circuit 409 with the timing given word counter 411, and sends the latched parallel data to word detecting circuit 412, frame detecting circuit 413 and frame buffer 404.

Word counter 411 which is a (m+1) step counter, delivers word clocks which are obtained by the clocks received from the receiver 408 and are frequency-divided by (m+1).

Word detecting circuit 412 has a function which detects out-of-step word synchronization in a condition such that word synchronization is established, and a function which detects the establishment of word synchronization in a condition such that out-of-step word synchronization is effected.

Further, the out-of-step word synchronization is defined as more than n now satisfactions of the mB1C code rule by signals on a transmission path, and the word synchronization is defined as the satisfaction of the mB1C code rule repeated several times (more than n) by signals on the transmission path.

Word detecting circuit 412 incorporates two counters.

The first counter is used for detecting out-of-step word synchronization when establishing word synchronization. Word detecting circuit 412 determines that the mB1C code rule is not satisfied and makes the first counter count up when parallel data of (m+1) bits sent from latch circuit 410 is out of the complementary relationship between its m-th bit and (m+1)-th bit (complementary bit C) in the condition in which word synchronization is established. Further, when the complementary relationship between m-th bit and (m+1)-th bit (complementary bit C) is satisfied, the first counter is reset. When the counted value of the first counter exceeds n, the word detecting circuit 412 determines that word synchronization is stepped out, and therefore delivers an out-of-step word synchronization signal to a failure detecting circuit 417. Then, the mode of word synchronization is established as follows:

The second counter is used for establishing word synchronization for out-of-step word synchronization.

Word detecting circuit 412 determines that the mB1C code rule is not satisfied and resets the second counter when parallel data of (m+1) bits sent from latch circuit 410 is out of the complementary relationship between its m-th bit and (m+1) bits (complementary bit C) in the condition in which word synchronization is stepped out. At this time, word detecting circuit 412 adds one to the value set on word counter 411, resulting in a one bit shift of latch timing. This step is repeated until the complementary relationship is satisfied. Further, the second counter is allowed to count up when the complementary relationship is satisfied between m-th bit and (m+1)-th (complementary bit C). When the value set on the second counter exceeds n, word detecting circuit 412 determines that word synchronization is established, and ceases the issuance of the out-of-step word synchronization to failure detecting circuit 417. Then the mode of detection of out-of-step word synchronization is established as mentioned above.

Frame detecting circuit 413 monitors whether parallel data of (m+1) bits delivered from latch circuit 410 is coincident with a synchronizing pattern or not. Frame detecting circuit 413 resets receiving counter 414 when a synchronizing pattern is detected.

Receiving counter 414 counts word clocks and delivers the number of data time slots for the received data, which is effected by an n-step counter corresponding to the number of data slots on the frame.

Delay circuit 416 sets the value of receiving counter 414 in the first receiving system 401 on transmitting counter 415 with some delay in consideration of a signal transmission delay through the subloop and the time required for detecting failures.

Transmitting counter 415 is set thereon with the number of data slots for transmitted data, from receiving counter 414 through delay circuit 416. Transmitting counter 415 delivers the number of data slots of transmitted data to R/W address selectors 418.

The second receiving system 402 is composed of a receiver 419, a phase adjusting circuit 420, series/parallel converting circuit 421, a latch circuit 422, a word counter 423, a word detecting circuit 424, a frame detecting circuit 425, a flag detecting circuit 426 and receiving counter 427.

Receiver 419 receives a signal from the subloop, and sends a clock recovered from the signal and received data.

Phase adjusting circuit 420 is used to adjust a signal received by the subloop to the phase of a clock recovered from a signal from the main loop.

Series/parallel converting circuit 421 which is a shift register having a serial input and a parallel output, receives serial data from receiver 419 and parallel data of (m+1) bits. Further, series/parallel converting circuit 421 is energized by clocks sent from receiver 408.

Latch circuit 422 latches parallel data of (m+1) bits sent from series/parallel converting circuit 421 with the timing given word counter 423, and sends the latched parallel data to word detecting circuit 424, frame detecting circuit 425, flag detecting circuit 426 and frame buffer 404.

Word counter 423 which is a (m+1) step counter, delivers word clocks which are obtained by the clocks received from the receiver 408 and are frequency-divided by (m+1).

Word detecting circuit 424 has a function which detects out-of-step word synchronization in a condition such that word synchronization is established, and a function which detects the establishment of word synchronization in a condition such that out-of-step word synchronization is effected.

Further, the out-of-step word synchronization is defined as more than n non-satisfactions of the mB1C code rule by signals on a transmission path, and the word synchronization is defined as the satisfaction of the mB1C code rule repeated several times (more than n) by signals on the transmission path.

Word detecting circuit 424 incorporates two counters.

The first counter is used for detecting out-of-step word synchronization when establishing word synchronization. Word detecting circuit 424 determines that the mB1C code rule is not satisfied and makes the first counter count up when parallel data of (m+1) bits sent from latch circuit 422 is out of the complementary relationship between its m-th bit and (m+1)-th bit (complementary bit C) in the condition in which word synchronization is established. Further, when the complementary relationship between m-th bit and (m+1)-th bit (complementary bit C) is satisfied, the first counter is reset. When the counted value of the first counter exceeds n, the word detecting circuit 424 determines that word synchronization is stepped out, and therefore delivers an out-of-step word synchronization signal to a failure detecting circuit 417. Then, the mode of word synchronization is established as follows:

The second counter is used for establishing word synchronization for out-of-step word synchronization.

Word detecting circuit 424 determines that the mB1C code rule is not satisfied and resets the second counter when parallel data of (m+1) bits sent from latch circuit 422 is out of the complementary relationship between its m-th bit and (m+1) bits (complementary bit C) in the condition in which word synchronization is stepped out. At this time, word detecting circuit 424 adds one to the value set on word counter 423, resulting in a one bit shift of latch timing. This step is repeated until the complementary relationship is satisfied. Further, the second counter is allowed to count up when the complementary relationship is satisfied between m-th bit and (m+1)-th (complementary bit C). When the value set on the second counter exceeds n, word detecting circuit 424 determines that word synchronization is established, and ceases the issuance of the out-of-step word synchronization to failure detecting circuit 417. Then the mode of detection of out-of-step word synchronization is established as mentioned above.

Frame detecting circuit 425 monitors whether parallel data of (m+1) bits delivered from latch circuit 422 is coincident with a synchronizing pattern or not. Frame detecting circuit 425 resets receiving counter 427 when a synchronizing pattern is detected.

A flag detecting circuit 426 monitors the first bit of parallel data of (m+1)-th bits, and calls a selector control section 430 to select a second receiving system 402 if the bit is affected.

Receiving counter 427 counts word clocks and delivers the number of data time slots for the received data, which is effected by an n-step counter corresponding to the number of data slots on the frame.

The bypass control system 403 is composed of failure detecting circuit 417, data selector 428, write address selector 429 and selector control section 430.

Failure detecting circuit 417 detects out-of-step word synchronization in accordance with an out-of-step word synchronization signal from word detecting circuits 412, 424. Further, failure detecting circuit 417 monitors the timing with which receiving counters 414, 427 in frame detecting circuits 413, 425 are reset. When this timing becomes irregular, the failure detecting circuit determines that out-of-step frame synchronization has occurred. Failure detecting circuit 417 includes a counter for counting word clocks delivered from the timing first received by system 401, and resets this counter with the timing of frame detection. If the value of this counter exceeds the maximum value among data slot numbers without being reset, out-of-step frame synchronization is detected. Failure detecting circuit 417 controls data selector 428 and write address selector 429 in association with the detection of out-of-step word synchronization and out-of-step frame synchronization.

Frame buffer 404 accumulates data delivered from latch circuit 410, 422 through data selector 428 with address corresponding to the number of data slots by the length of one frame. Frame buffer 404 writes received data on the address corresponding to the number of data slot delivered from receiving counter 414, 427, and reads out data, as transmitted data, from the address corresponding to the number of data slots delivered from the transmitting counter 415. Further, the timing of read/write is generated from a frame buffer control section 431. Frame buffer 404 is realized with a memory of data slots $\times$ (m+1) bits.

A selector control section 430, controls a data selector 428 and a write address selector 429 under instruction of flag detecting circuit 426. Further, when failure detecting circuit 417 detects a failure signal, the first receiving system 401 is selected irrespective of the output of flag detecting circuit 426.

Frame buffer control system 405 is composed of frame buffer control section 431 and R/W address selector 418.

Frame buffer control section 405 generates the timing of read/write (R/W) of data on frame buffer 404 and selects read/write (R/W) address.

R/W address selector 418 selects the address of read/write (R/W) to frame buffer 404 under control of a frame buffer control section 431.

First transmitting system 406 is composed of parallel/series converting circuit 432 and transmitter 433.

Parallel/series circuit 432 receives parallel data of (m+1) bits corresponding to the address indicated by transmitting counter 415 from frame buffer 404 with the timing generated from the frame buffer control section 431, and delivers serial data with the timing of the clock sent from receiver 408.

Transmitter 433 transmits serial data sent from parallel/series converting circuit 432, to the main loop with the timing of clocks sent from receiver 408.

Second transmitting system 407 is composed of transmitter 434 and a flag reset circuit 435.

Flag reset circuit 435 resets the flag of a signal received from the main loop, and incorporates a (m+1) stepping counter which counts clocks sent from receiver 408. Further, this counter is reset by a word clock (in order to cope with such a situation as out-of-step word synchronization). The value indicated by this counter shows the first bit which is at the forefront of a word, and flag detecting circuit 435 resets this first bit (flag).

Transmitter 434 receives data delivered from flag reset circuit 435 and clocks delivers signals to the subloop with the timing of these clocks.

The following explanation refers to the operation of branch station 3 (4).

The first receiving system 401 receives a signal from the main loop through receiver 408, and takes this signal into latch circuit 410 through receiver 408, and takes this signal into latch circuit 410 through series/parallel converting circuit 409. Word detecting circuit 412 detects a word taken in latch circuit 410, and frame detecting circuit 413 detects a frame, thereby word synchronization and frame synchronization are established. Frame buffer control section 431 generates the timing with which received data are written in frame buffer 404.

Meanwhile, a second receiving system 402 receives a signal from the subloop through receiver 419, adjusting the signal in phase adjusting circuit 420 to the phase of clocks recovered from received data by receiver 408, and takes this signal to latch circuit 422 through series/parallel converting circuit 423. Word detecting circuit 424 detects a word from this received data taken in latch circuit 422, and frame detecting circuit 425 detects a frame, thereby word synchronization and frame synchronization are established. Frame buffer control section 431 generates the timing with which received data is written in frame buffer 404.

Thus, in the first and second receiving system 401, 402, signals from the main loop and signals from the subloop can be accumulated independently from each other, in frame buffer 404. The read-out from frame buffer 404 is made in consideration of the timing delay in the transmission of a signal from the subloop and the timing of failures thereof. Further, data accumulated in frame buffer 404 are read out to parallel/series converting circuit 432 with the timing generated from frame buffer control section 431 from the address corresponding to the data slot numbers indicated by transmitting counter 415, and transmitted from the transmitter 433 to the main loop. Further, selector control section 430 carries out the selecting operation of the above-mentioned data selector 428 and write address selector 429. That is, selector control section 430 controls data selector 428 and write address selector 429 under instructions of flag detecting circuit 426.

Thus, in the subloop branch station constituted as mentioned above, when flag detecting circuit 426 detects a flag which is set, data received by the second receiving system 402 is written in frame buffer 404. Data are read out from frame buffer 404 in consideration of a timing delay in the transsssion of a signal in the subloop, and are transmitted to the main loop.

Further, if signals which do not satisfy the mB1C code rule are successively generated or is a frame synchronizing pattern disappears, failure detecting circuit 417 inhibits data selector 428 and write address selector 429 from selecting the second receiving system 402. Further, since data are read out in synchronization with a frame in frame buffer 404, those signals in the main loop may be returned to the main loop without being missed.

Accordingly, even if erroneous signals are generated due to a failure in the subloop, and therefore, a part of data is missed, data received from the main loop, instead of the afore-mentioned data, are transmitted in synchronization with the timing of the transmission of the afore-mentioned signal. Therefore, the next stage station can ensure the establishment of word synchronization and frame synchronization. Thus, neither out-of-step word synchronization, nor out-of-step frame synchronization caused by a failure in the subloop affects the main loop, it is thereby possible to effectively prevent these out-of-step synchronizations from affecting the entire network.

Figure 5:
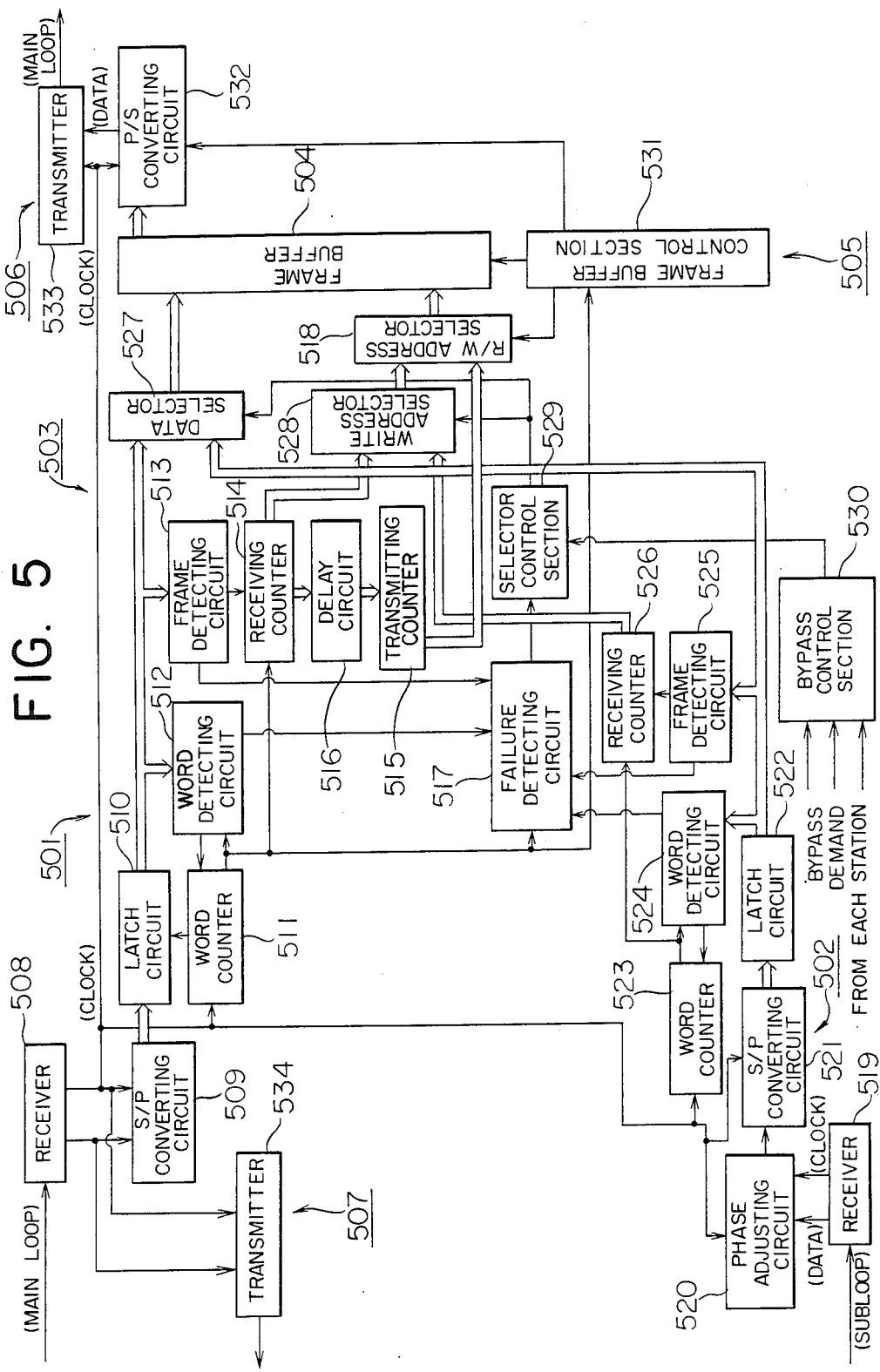
Figure 8:
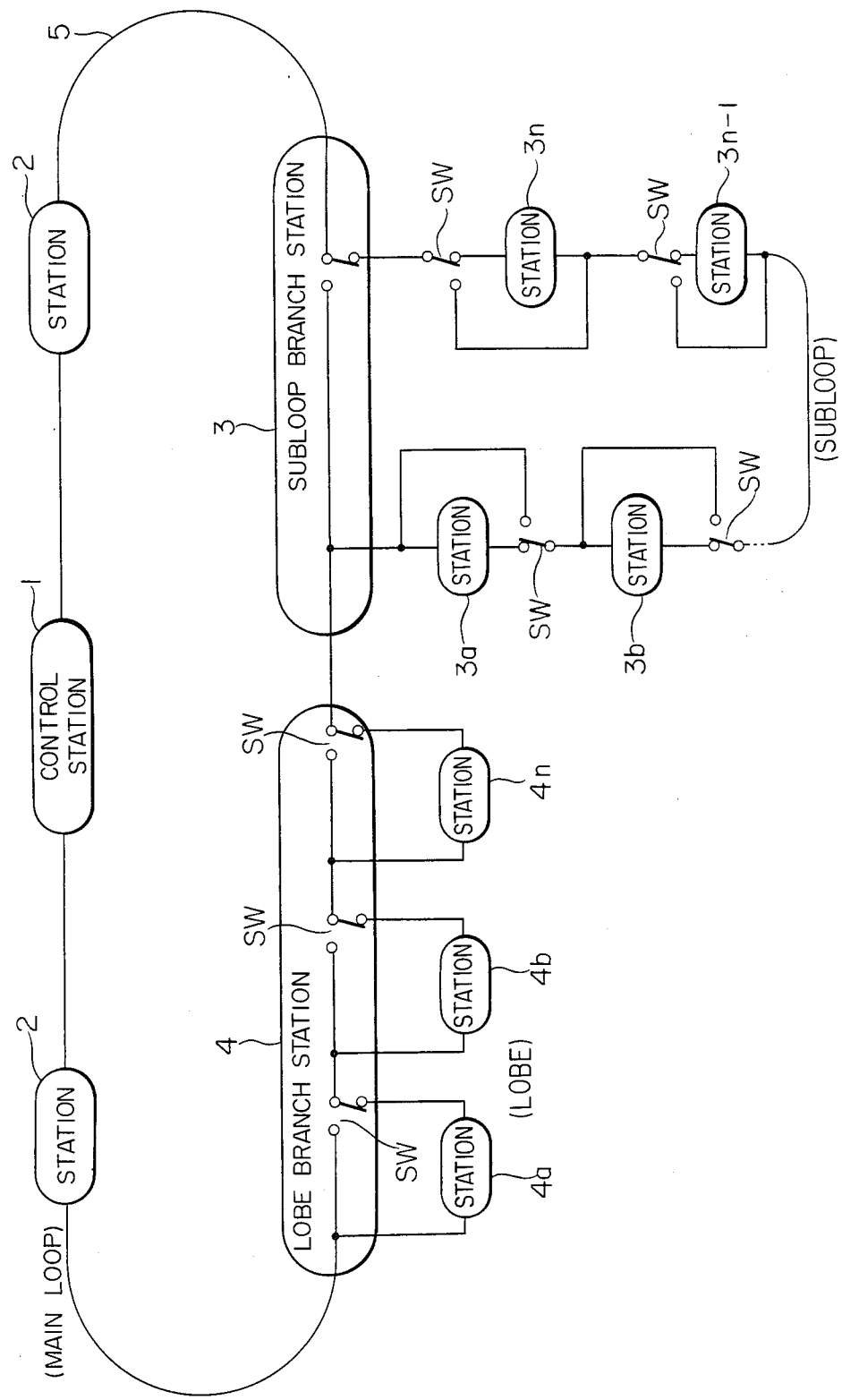
FIG. 8 is a schematic illustration of an arrangement of a loop network.

FIG. 5 shows a schematic view illustrating a branch station 3 (4) incorporated a loop network relating to the fifth embodiment. In this figure, the format of signals passing through transmission paths in used as shown in FIG. 9, and data slots are coded with mB1C while a unique pattern of (m+1), which will not appear in the data slots, is used as the pattern of synchronization. The arrangement and operation of the above-mentioned branch station will be explained.

Here, each station $3a, 3b, - - - 3n$ has a function for issuing a bypass demand to the branch station of subloop. Existent paths transmit the bypass demand between the stations $3a, 3b - - - 3n$ and the branch station.

Branch station 3 is composed of the first receiving system 501 for receiving, at its input stage, a signal from a main loop as a main transmission path, a second receiving system 502 for receiving a signal from a lobe or a subloop, a bypass control system 503 for selecting these two signal system to write a signal to frame buffer, a frame buffer 504, a frame buffer control system 505, first transmitter system 506 for transmitting a signal to a main loop and second transmitter system 507 for transmitting a signal to subloop.

The first receiving system 501 is composed of a receiver 508, a series/parallel converting circuit 509, a latch circuit 510, a word counter 511, a word detecting circuit 512, a frame detecting circuit 513, a receiving counter 514, a transmitting counter 515 and a delay circuit 516.

Receiver 508 receives a signal from the main loop, and sends a clock recovered from the signal and received data.

A series/parallel converting circuit 509, which is a shift register having a serial input and a parallel output, receives serial data from receiver 508 and sends parallel data of (m+1) bits. Further, this series/parallel converting circuit 509 is energized with a clock transmitted from the receiver 508.

Latch circuit 510 latches parallel data of (m+1) bits sent from series/parallel converting circuit 509 with the timing given word counter 511, and sends the latched parallel data to word detecting circuit 512, frame detecting circuit 513 and frame buffer 504.

Word counter 511 which is a (m+1) step counter, delivers word clocks which are obtained by the clocks received from the receiver 508 and are frequency-divided by (m+1).

Word detecting circuit 512 has a function which detects out-of-step word synchronization in a condition such that word synchronization is established, and a function which detects the establishment of word synchronization in a condition such that out-of-step word synchronization is effected.

Further, the out-of-step word synchronization is defined as more than n non-satisfactions of the mB1C code rule by signals on a transmission path, and the word synchronization is defined as the satisfaction of the mB1C code rule repeated several times (more than n) by signals on the transmission path.

Word detecting circuit 512 incorporates two counters.

The first counter is used for detecting out-of-step word synchronization when establishing word synchronization. Word detecting circuit 512 determines that the mB1C code rule is not satisfied and makes the first counter count up when parallel data of (m+1) bits sent from latch circuit 510 is out of the complementary relationship between its m-th bit and (m+1)-th bit (complementary bit C) in the condition in which word synchronization is established. Further, when the complementary relationship between m-th bit and (m+1)-th bit (complementary bit C) is satisfied, the first counter is reset. When the counted value of the first counter exceeds n, the word detecting circuit 512 determines that word synchronization is stepped out, and therefore delivers an out-of-step word synchronization signal to a failure detecting circuit 517. Then, the mode of word synchronization is established as follows:

The second counter is used for establishing word synchronization for out-of-step word synchronization.

Word detecting circuit 512 determines that the mB1C code rule is not satisfied and resets the second counter when parallel data of (m+1) bits sent from latch circuit 510 is out of the complementary relationship between its m-th bit and (m+1) bits (complementary bit C) in the condition in which word synchronization is stepped out. At this time, word detecting circuit 512 adds one to the value set on word counter 511, resulting in a one bit shift of latch timing. This step is repeated until the complementary relationship is satisfied. Further, the second counter is allowed to count up when the complementary relationship is satisfied between m-th bit and (m+1)-th (complementary bit C). When the value set on the second counter exceeds n, word detecting circuit 512 determines that word synchronization is established, and ceases the issuance of the out-of-step word synchronization to failure detecting circuit 517. Then the mode of detection of out-of-step word synchronization is established as mentioned above.

Frame detecting circuit 513 monitors whether parallel data of (m+1) bits delivered from latch circuit 510 is coincident with a synchronizing pattern or not. Frame detecting circuit 513 resets receiving counter 514 when a synchronizing pattern is detected.

Receiving counter 514 counts word clocks and delivers the number of data time slots for the received data, which is effected by an n-step counter corresponding to the number of data slots on the frame.

Delay circuit 516 sets the value of receiving counter 514 in the first receiving system 501 on transmitting counter 515 with some delay in consideration of a signal transmission delay through the subloop and the time required for detecting failures.

Transmitting counter 515 is set thereon with the number of data slots for transmitted data, from receiving counter 514 through delay circuit 516. Transmitting counter 515 delivers the number of data slots of transmitted data to R/W address selector 518.

The second receiving system 502 is composed of a receiver 519, a phase adjusting circuit 520, series/parallel converting circuit 521, a latch circuit 522, a word counter 523, a word detecting circuit 524, a frame detecting circuit 525 and receiving counter 526.

Receiver 519 receives a signal from the subloop, and sends a clock recovered from the signal and received data.

Phase adjusting circuit 520 is used to adjust a signal received by the subloop to the phase of a clock recovered from a signal from the main loop.

Series/parallel converting circuit 521 which is a shift register having a serial input and a parallel output, receives serial data from receiver 519 and parallel data of (m+1) bits. Further, series/parallel converting circuit 521 is energized by clocks sent from receiver 508.

Latch circuit 522 latches parallel data of (m+1) bits sent from series/parallel converting circuit 521 with the timing given word counter 523, and sends the latched parallel data to word detecting circuit 524, frame detecting circuit 525 and frame buffer 504.

Word counter 523, which is a (m+1) step counter, delivers word clocks which are obtained by the clocks received from the receiver 508 and are frequency-divided by (m+1).

Word detecting circuit 524 has a function which detects out-of-step word synchronization in a condition such that word synchronization is established, and a function which detects the establishment of word synchronization in a condition such that out-of-step word synchronization is effected.

Further, the out-of-step word synchronization is defined as more than n non-satisfactions of the mB1C code rule by signals on a transmission path, and the word synchronization is defined as the satisfaction of the mB1C code rule repeated several times (more than n) by signals on the transmission path.

Word detecting circuit 524 incorporates two counters.

The first counter is used for detecting out-of-step word synchronization when establishing word synchronization. Word detecting circuit 524 determines that the mB1C code rule is not satisfied and makes the first counter count up when parallel data of (m+1) bits sent from latch circuit 522 is out of the complementary relationship between its m-th bit and (m+1)-th bit (complementary bit C) in the condition in which word synchronization is established. Further, when the complementary relationship between m-th bit and (m+1)-th bit (complementary bit C) is satisfied, the first counter is reset. When the counted value of the first counter exceeds n, the word detecting circuit 524 determines that word synchronization is stepped out, and therefore delivers an out-of-step word synchronization signal to a failure detecting circuit 517. Then, the mode of word synchronization is established as follows:

The second counter is used for establishing word synchronization for out-of-step word synchronization.

Word detecting circuit 524 determines that the mB1C code rule is not satisfied and resets the second counter when parallel data of (m+1) bits sent from latch circuit 522 is out of the complementary relationship between its m-th bit and (m+1) bits (complementary bit C) in the condition in which word synchronization is stepped out. At this time, word detecting circuit 524 adds one to the value set on word counter 523, resulting in a one bit shift of latch timing. This step is repeated until the complementary relationship is satisfied. Further, the second counter is allowed to count up when the complementary relationship is satisfied between m-th bit and (m+1)-th (complementary bit C). When the value set on the second counter exceeds n, word detecting circuit 524 determines that word synchronization is established, and ceases the issuance of the out-of-step word synchronization to failure detecting circuit 517. Then the mode of detection of out-of-step word synchronization is established as mentioned above.

Frame detecting circuit 525 monitors whether parallel data of (m+1) bits delivered from latch circuit 522 is coincident with a synchronizing pattern or not. Frame detecting circuit 525 resets receiving counter 526 when a synchronizing pattern is detected.

Receiving counter 526 counts word clocks and delivers the number of data time slots for the received data, which is effected by an n-step counter corresponding to the number of data slots on the frame.

The bypass control system 503 is composed of failure detecting circuit 517, data selector 527, write address selector 528, selector control section 529 and bypass control section 530.

Failure detecting circuit 517 detects out-of-step word synchronization in accordance with an out-of-step word synchronization signal from word detecting circuits 512, 524. Further, failure detecting circuit 517 monitors the timing with which receiving counters 514, 526 in frame detecting circuits 513, 525 are reset. When this timing becomes irregular, the failure detecting circuit determines that out-of-step frame synchronization has occured. Failure detecting circuit 517 includes a counter for counting word clocks delivered from the timing first received by system 501, and resets this counter with the timing of frame detection. If the value of this counter exceeds the maximum value among data slot numbers without being reset, out-of-step frame synchronization is detected. Failure detecting circuit 517 controls data selector 527 and write address selector 528 in association with the detection of out-of-step word synchronization and out-of-step frame synchronization.

Frame buffer 504 accumulates data delivered from latch circuit 510, 522 through data selector 527 with address corresponding to the number of data slots by the length of one frame. Frame buffer 504 writes received data on the address corresponding to the number of data slot delivered from receiving counter 514, 526, and reads out data, as transmitted data, from the address corresponding to the number of data slots delivered from the transmitting counter 515. Further, the timing of read/write is generated from a frame buffer control section 531. Frame buffer 504 is realized with a memory of data slots×(m+1) bits.

A selector control section 529, controls data selector 527 and write address selector 528 under instruction of bypass control section 530. Further, when failure detecting circuit 517 detects a failure signal, the first receiving system 501 is selected irrespective of the output of bypass control section 530.

Bypass control section 530 delivers bypass demand from bypass demand signal of stations 3a, 3b,- - - 3n of subloop or lobe to selector control section 529.

Frame buffer control system 505 is composed of frame buffer control section 531 and R/W address selector 518.

Frame buffer control section 531 generates the timing of read/write (R/W) of data on frame buffer 504 and selects read/write (R/W) address.

R/W address selector 518 selects the address of read/write (R/W) to frame buffer 504 under control of a frame buffer control section 531.

First transmitting system 506 is composed of parallel/series converting circuit 532 and transmitter 533.

Parallel/series circuit 532 receives parallel data of (m+1) bits corresponding to the address indicated by transmitting counter 515 from frame buffer 504 with the timing generated from the frame buffer control section 531, and delivers serial data with the timing of the clock sent from receiver 508.

Transmitter 533 transmits serial data sent from parallel/series converting circuit 532, to the main loop with the timing of clocks sent from receiver 508.

Second transmitting system 507 is composed of transmitter 534.

Transmitter 514 transmits data and clocks delivered from receiver 508, to main loop with the timing of clocks sent from receiver 508.

The following explanation refers to the operation of branch station 3 (4).

Bypass control section 530, performs the switching of data selector 527 and write address selector 528, in accordance with bypass demand signals from stations 3a, 3b - - - 3n in the subloop or lobe. Normally, bypass control section 530 switches data selector 527 and address selector 528 to second receiving system 502, where a signal received by the second receiving system is accumulated in frame buffer 504 in a single frame. In response to the bypass demand from stations 3a, 3b, - - - 3n in the subloop, bypass control section 530 switches data selector 527 and address selector 528 to first receiving system 501.

Stations 3a, 3b - - - 3n in the subloop and bypass control section 530 are connected to each other with a common transmission path or a transmission path exclusive for each station.

Normally in branch station 3 thus arranged, a signal from the lobe or subloop, coupled through branch station 3 into main transmission path 5, is received by second receiving system 502, accumulated in frame buffer 504, and then supplied to the next step station.

The main operation of this embodiment will be described with reference to the flow chart of FIG. 6. If it is necessary to bypass subloop 3a, 3b - - - 3n, (for example 3a), station 3a of the subloop transmits this information to the station branching from main transmission path 5 into the subloop, i.e., subloop branch station 3, through a transmission path provided in common with the other stations belonging to the subloop or an exclusive transmission path (step 601). In response to the bypass demand, bypass control section 530 for subloop branch station 3 switches data selector 527 and write address selector 528 from second receiving system 502 to first receiving system 501 (step 602). Subloop branch station 3 further informs station 3a, which is part of subloop, with respect to the switching being made, in accordance with the bypass demand, whereby frame 6, flowing through main transmission path 5 bypasses all the stations (3a, 3b- - - 3n) of the subloop; That is, without passing these stations (step 603). As a result, the signal from main transmission path 5, which is received by first receiving system 501, i.e., which does not pass through the lobe or subloop, is accumulated in frame buffer 504 in a single frame. By means of transmitting counter 515, actuated under the delay control performed by the delay circuit 516, the received signal from main transmission path 5 is synchroniously transmitted with the present signal-transmission. When receiving information indicating termination of switching from subloop branch station 3, station 3a, which is part of the subloop, closes the by pass switch SW so that it is bypassed.

At this time, subloop branch station 3 monitors the interference of the signal, caused by the switching (step 604), and after the problem is corrected, subloop branch station 3 again switches them to second receiving system 502 (step 605).

Thus, in this embodiment, even if a signal malfunction occurs because of the switching of the bypass switch SW of the lobe or subloop and a portion of the data, the above-mentioned received signal from main transmission path 5 is supplied with the signal-transmitting timing. Therefore, it is possible to effectively prevent the entire network from being affected by an out-of-step condition resulting from the bypass switches SW of the lobe or subloop.

In the application of the present invention to a substrate level network in a station, for example, connector portion 720 of a substrate is formed, as shown in FIG. 7, where contact switches are provided at the portions designated by references A and C. When one the contact switches provided at A and C is in the on-condition, the substrate level network in the station is bypassed. On the other hand, when both are in the on or off condition, it is not bypassed.

During separation of the substrate, with the substrate being arranged to be pulled out, when the substrate is pulled out to the position of A, the entire substrate level network in the station is bypassed. The substrate is bypassed when it reaches a position represented by B, and the bypassing of the entire substrate network is released when it reaches the position of C.

On the other hand, during the insertion of the substrate, when it is inserted to the position of C, the entire substrate level network in the station is bypassed. The substrate has been inserted at the B position and, at the A position, the bypassing of the entire substrate level network in the station is released.

The bypassing of the entire substrate network in the station can be realized by the exclusive OR of the switches at positions A and C and by using the control of FIG. 1 selectors.

The failure detection mode in this failure detecting circuit is similar to the preferred embodiment shown in FIG. 2.

In the thus constituted subloop branch station, these signals in the main loop can be returned to the main loop without being missed, using the bypass mode operation of a station in the subloop.

Further, upon failure of a substation in the subloop, this arrangement also exhibits the effects which are similar to those offered by the second preferred embodiment.

Thus, the next stage station can securely establish word synchronization and frame synchronization from received signals, and therefore, neither out-of-step word synchronization nor out-of-step frame synchronization caused by a failure in the subloop affects the main loop. As a result, it is possible to effectively prevent such a failure from affecting the entire network.

What is claimed is:

1. A loop network arranged by loop-connecting a control station and a number of substations through a main transmission path where at least one of the substations comprises a branch station for inserting and coupling another station into the main transmission path as a lobe or subloop;
said branch station including a frame buffer for, during a normal condition, selecting a signal from the lobe or subloop and for, during an abnormal condition, selecting a signal from the main transmission path and accumulating one frame of said selected signal, and including means for transmitting the accumulated signal to the main transmission path, wherein the lobe or subloop is bypassed during the abnormal condition.

2. A loop network according to claim 1, wherein the time of the abnormal condition refers to the time of occurrence of a bypass demand from said lobe or subloop station, and wherein said loop network further comprises a switching mechanism for generating a command to switch a signal from said lobe or subloop station into the signal from said transmission path in response to the bypass demand and a selecting mechanism for selecting the signal from said lobe or subloop, or the signal from said main transmission path, in accordance with the command of the selecting mechanism, and for supplying the selected signal to said frame buffer.

3. A loop network according to claim 1, wherein the time of abnormal conditions refers to the time of occurrence of a bypass demand from said lobe or subloop station, and said loop network is further comprised of a switching mechanism for generating a command to switch a signal from said lobe or subloop station into a signal from said main transmission path in response to the bypass demand; said frame buffer having two ports for writing the signal from said lobe or subloop and the signal from said main transmission path.

4. A loop network according to claim 1, further comprising a synchronization pattern generating mechanism for generating a synchronization pattern at a predetermined interval.

5. A loop network according to claim 1, wherein the time of an abnormal condition refers to a time of occurrence of failures of said lobe or subloop, said loop network is further comprised of a mechanism for detecting failures of said lobe or subloop, and a selecting mechanism for normally selecting the signal from said lobe or subloop and during an abnormal condition, for selecting the signal from said main transmission path; the selected signal being supplied to said frame buffer.

6. A loop network arranged by loop-connecting a control station and a number of substations through a main transmission path where at least one of the substations comprises a branch station inserting and coupling another station into said main transmission path as a lobe or subloop, said branch station including a first frame buffer for accumulating a signal from said main transmission path in single frames, a second frame buffer for accumulating a signal from said lobe or subloop in units of a single frame, a mechanism for detecting failures of said lobe or subloop, and a mechanism for normally selecting the signal accumulated in said second frame buffer and, in response to the detection of failure in said lobe or subloop, selecting the signal accumulated in said first frame buffer; the selected signal being supplied to said main transmission path, wherein the lobe or subloop is bypassed during the detection of a failure of said lobe or subloop.

* * * * *